US012797738B2

(12) United States Patent
Deng

(10) Patent No.: US 12,797,738 B2
(45) Date of Patent: Nov. 17, 2026

(54) PROP INTERACTION METHOD AND APPARATUS IN VIRTUAL SCENE, ELECTRONIC DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventor: Yu Deng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 233 days.

(21) Appl. No.: 18/670,640

(22) Filed: May 21, 2024

(65) Prior Publication Data

US 2024/0307780 A1 Sep. 19, 2024

Related U.S. Application Data

(63) Continuation of application No. PCT/CN2023/085343, filed on Mar. 31, 2023.

(30) Foreign Application Priority Data

Jun. 2, 2022 (CN) ......................... 202210625554.5

(51) Int. Cl.
*A63F 13/56* (2014.01)
*A63F 13/52* (2014.01)
*G06T 17/00* (2006.01)

(52) U.S. Cl.
CPC ............. *A63F 13/56* (2014.09); *A63F 13/52* (2014.09); *G06T 17/00* (2013.01)

(58) Field of Classification Search
CPC ................................ A63F 13/45; A63F 13/56
See application file for complete search history.

(56) References Cited

U.S. PATENT DOCUMENTS 7,585,224 B2 * 9/2009 Dyke-Wells ........ A63F 13/5372 348/240.99
2002/0034979 A1 * 3/2002 Yamamoto ............. A63F 13/56 463/31

(Continued)

FOREIGN PATENT DOCUMENTS

CN 108245892 A 7/2018
CN 110721468 A 1/2020

(Continued)

OTHER PUBLICATIONS

Tencent Technology, ISR, PCT/CN2023/085343, Jun. 22, 2023, 3 pgs.

(Continued)

*Primary Examiner* — Jay Trent Liddle
(74) *Attorney, Agent, or Firm* — Morgan, Lewis & Bockius LLP

(57) ABSTRACT

This application provides a prop interaction method in a virtual scene performed by an electronic device. The method includes: displaying at least part of a region in the virtual scene in a human-computer interaction interface, where the at least part of the region includes a virtual object; in response to appearance of at least two virtual props in the at least part of the region, choosing a first virtual prop in the least two virtual props to be in a selected state based on at least a spatial relationship between each of the least two virtual props and the virtual object; and displaying at least one interaction control corresponding to the first virtual prop, wherein the interaction control, when triggered, is configured to execute an interaction function corresponding (Continued)

to the interaction control for performing interaction between the virtual object and the first virtual prop.

20 Claims, 14 Drawing Sheets

(56) References Cited

U.S. PATENT DOCUMENTS

| | | | | |
|---|---|---|---|---|
| 2004/0157662 | A1* | 8/2004 | Tsuchiya | A63F 13/5378 463/32 |
| 2004/0176163 | A1* | 9/2004 | Ishihata | A63F 13/52 463/30 |
| 2011/0124386 | A1* | 5/2011 | Kondo | A63F 13/10 463/4 |
| 2024/0091643 | A1* | 3/2024 | Luo | A63F 13/56 |

FOREIGN PATENT DOCUMENTS

| | | | |
|---|---|---|---|
| CN | 112007360 | A | 12/2020 |
| CN | 112121431 | A | 12/2020 |
| CN | 112295230 | A | 2/2021 |
| CN | 112402948 | A | 2/2021 |
| CN | 112691366 | A | 4/2021 |
| CN | 113041611 | A | 6/2021 |
| CN | 113398572 | A | 9/2021 |
| CN | 113577762 | A | 11/2021 |
| CN | 114146414 | A | 3/2022 |
| CN | 114344903 | A | 4/2022 |
| JP | 2015019885 | A | 2/2015 |
| JP | 2002095868 | A | 4/2022 |
| WO | WO 2022068452 | A1 | 4/2022 |

OTHER PUBLICATIONS

Tencent Technology, Written Opinion, PCT/CN2023/085343, Jun. 22, 2023, 5 pgs.

Tencent Technology, Japanese Office Action, JP Patent Application No. 2024-532934, Feb. 5, 2025, 12 pgs.

Skyrimsereturn.blogspot.com, Tissonia, "Arrive in Mosal—Talk to the Townspeople", Jan. 2018, Retrieved from the Internet: https://skyrimsereturn.blogspot.com/2018/01/blog-post_28.html.

Tencent Technology, Korean Office Action, KR Patent Application No. 10-2024-7016347, Sep. 11, 2025, 10 pgs.

* cited by examiner

PROP INTERACTION METHOD AND APPARATUS IN VIRTUAL SCENE, ELECTRONIC DEVICE, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2023/085343, entitled "PROP INTERACTION METHOD AND APPARATUS IN VIRTUAL SCENE, ELECTRONIC DEVICE, COMPUTER-READABLE STORAGE MEDIUM, AND COMPUTER PROGRAM PRODUCT" filed on Mar. 31, 2023, which claims priority to Chinese Patent Application No. 202210625554.5 filed on Jun. 2, 2022, all of which is incorporated herein by reference in its entirety.

FIELD OF THE TECHNOLOGY

This application relates to human-computer interaction technologies, and in particular, to a prop interaction method and apparatus in a virtual scene, an electronic device, a computer-readable storage medium, and a computer program product.

BACKGROUND OF THE DISCLOSURE

A display technology based on graphics processing hardware has expanded channels for perceiving an environment and acquiring information, especially a multimedia technology of a virtual scene. With the help of a human-computer interaction engine technology, diversified interaction between virtual objects controlled by a user or artificial intelligence according to an actual application requirement can be implemented, and the technology has various typical application scenarios, for example, in a virtual scene such as a game and the like, a combat process between the virtual objects can be simulated.

In the virtual scene, a plurality of virtual props having an interaction function are usually configured, so that a virtual object may be controlled to interact with the virtual props, for example, an action interaction such as the virtual object sits on a chair and the like, and a function interaction such as unpacking a supply box to display a plurality of materials for the virtual object to select and the like. In the related art, it is difficult to identify a virtual prop that a player is currently interacting with. A user needs to find a suitable virtual prop through constant trial and error, which increases the complexity of human-computer interaction. Moreover, continuous trial and error wastes computing resources and communication resources, and even affects the operation smoothness of the virtual scene.

SUMMARY

Embodiments of this application provide a prop interaction method and apparatus in a virtual scene, an electronic device, a computer-readable storage medium, and a computer program product, which can recommend a to-be-interacted virtual prop to a user to improve the human-computer interaction efficiency.

Technical solutions in the embodiments of this application are implemented as follows:

An embodiment of this application provides a prop interaction method in a virtual scene, performed by an electronic device, the method including:

displaying at least part of a region in the virtual scene in a human-computer interaction interface, the at least part of the region including a virtual object;

in response to appearance of at least two virtual props in the at least part of the region, each having a corresponding interaction function in the at least part of the region, choosing a first virtual prop in the least two virtual props to be in a selected state based on at least a spatial relationship between each of the least two virtual props and the virtual object; and displaying at least one interaction control corresponding to the first virtual prop, wherein the interaction control, when triggered, is configured to execute the interaction function corresponding to the interaction control for performing interaction between the virtual object and the first virtual prop.

An embodiment of this application provides a prop interaction method in a virtual scene, performed by an electronic device, the method including:

displaying at least part of a region in the virtual scene in a human-computer interaction interface, the at least part of the region including a virtual object;

in response to appearance of at least two virtual props in the at least part of the region, displaying, based on a selected state, a first virtual prop having an interaction function in the at least two virtual props and at least one interaction control corresponding to the first virtual prop, the interaction control being configured to be triggered to execute the interaction function corresponding to the interaction control, and the interaction function being configured for performing interaction between the virtual object and the first virtual prop; and for at least one second virtual prop not in the selected state, displaying a switching control corresponding to the at least one second virtual prop, the switching control being configured to be triggered to display an interaction control corresponding to the at least one second virtual prop.

An embodiment of this application provides an electronic device, including:

a memory, configured to store a computer-executable instruction; and a processor, configured to implement, when executing the computer-executable instruction stored in the memory, the prop interaction method in a virtual scene according to the embodiments of this application.

An embodiment of this application provides a non-transitory computer-readable storage medium, having a computer-executable instruction stored therein, where the computer-executable instruction, when executed by a processor of an electronic device, causes the electronic device to perform the prop interaction method in a virtual scene according to the embodiments of this application is implemented.

The embodiments of this application have the following beneficial effects:

In response to appearance of at least two virtual props having an interaction function in at least part of a region, that a first virtual prop in at least two virtual props is in a selected state is displayed, and at least one interaction control corresponding to the first virtual prop is displayed, so that the first virtual prop and the corresponding interaction control that are automatically selected are directly displayed to a user, a process that the user manually selects a virtual prop that needs to be interacted with currently is omitted, and the human-computer interaction efficiency may be effectively improved.

DESCRIPTION OF EMBODIMENTS

Figure 1A:
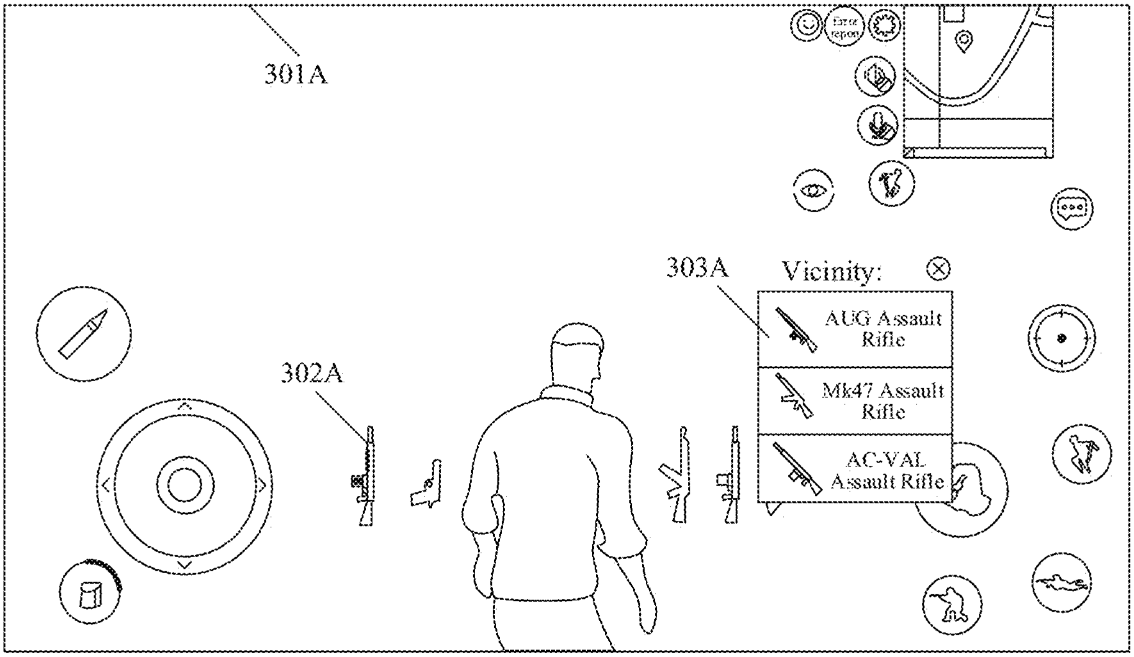
FIG. 1A and FIG. 1B are schematic diagrams of interfaces of a prop interaction method in a virtual scene according to the related art.

In order to make the objectives, technical solutions, and advantages of this application clearer, the following describes this application in further detail with reference to the accompanying drawings. The described embodiments are not to be regarded as a limitation to this application. All other embodiments obtained by a person of ordinary skill in the art without creative efforts shall fall within the protection scope of this application.

In the following description, the term "some embodiments" describes a subset of all possible embodiments, but "some embodiments" may be the same subset or different subsets of all the possible embodiments, and can be combined with each other without conflict.

In the following description, the terms "first/second/third" are merely intended to distinguish between similar objects rather than describe a specific order of the objects. "First/second/third" are interchanged in terms of a specific order or sequence if permitted, so that the embodiments in this application described herein can be implemented in an order other than the order illustrated or described herein.

Unless otherwise defined, meanings of all technical and scientific terms used in this specification are the same as those usually understood by a person skilled in the art to which this application belongs. The terms used in this specification are merely intended to describe the embodiments of this application, but are not intended to limit this application.

Before the embodiments of this application are further described in detail, nouns and terms involved in the embodiments of this application are described, and the nouns and terms involved in the embodiments of this application are applicable to the following explanations.

1) A virtual scene is a scene that is outputted through a device and different from a real world, and can form a visual perception of a virtual scene through naked eyes or with assistance of the device, for example, a two-dimensional image outputted through a display screen, or a three-dimensional image outputted through a stereoscopic display technology such as a stereoscopic projection, a virtual reality, an augmented reality, and the like. In addition, various perceptions of a simulated real-world such as an auditory perception, a tactile perception, an olfactory perception, and a motion perception can also be formed through various possible hardware.

2) In response to is configured for indicating a dependent condition or state of a performed operation. When the dependent condition or state is met, one or more performed operations may be real-time or may have a set delay. Unless otherwise specified, there is no restriction on an execution order of the plurality of performed operations.

3) A client is an application program running in a terminal to provide various services, such as a game client, and the like.

4) An interaction prop refers to a virtual prop having an interaction function, and a player controls a virtual object to interact with the interaction prop. For example, the virtual object may ride on a "vehicle", and the "vehicle" belongs to the interaction prop. The virtual object cannot interact with a desk in a building, so that the "desk" does not belong to the interaction prop, but only belongs to an ordinary virtual object.

Figure 1B:
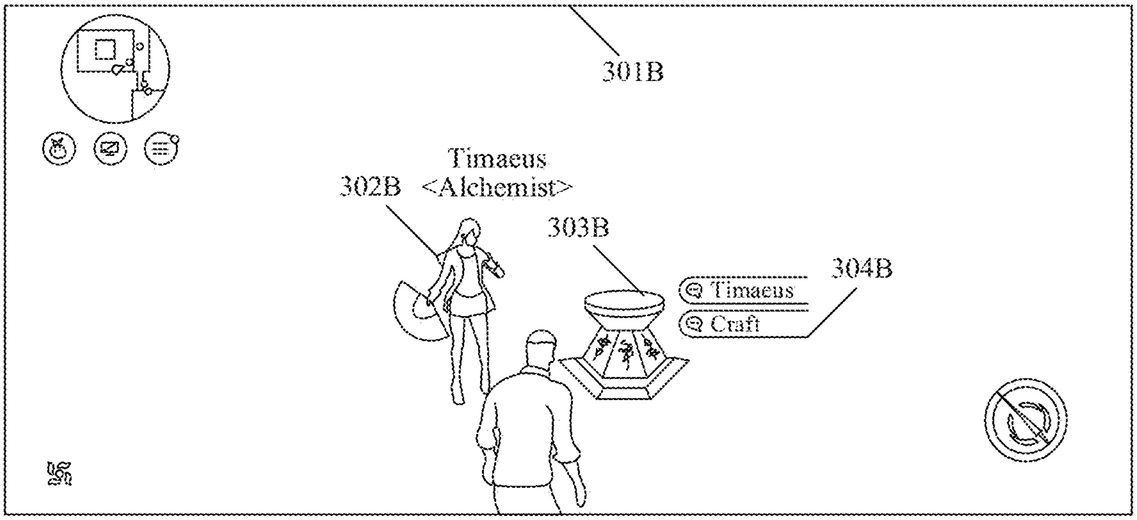

Referring to FIG. 1A, a plurality of virtual props 302A of a virtual object are displayed in a human-computer interaction interface 301A. Each virtual prop 302A is obtained through range identification or crosshair identification, and in response to a trigger operation on an interaction control 303A of each virtual prop 302A, a picking operation on a corresponding virtual prop 302A is completed. Referring to FIG. 1B, only a crafting table 302B and a non-player controlled character 303B are displayed in a human-computer interaction interface 301B. The crafting table 302B and the non-player controlled character 303B are obtained through range identification, and in response to a trigger operation on an interaction control 304B of the crafting table 302B, the crafting table is triggered to perform crafting processing.

In the related art, there is no interaction priority between interactive virtual props, there is no prompt for clarifying a virtual prop that is interacted with in a virtual scene, and there is no interaction mechanism set between a virtual object and a plurality of interactive virtual props.

In the related art, a player may place an interactive virtual prop in the virtual scene. Therefore, a planar position and a spatial position of the virtual prop have many possibilities, and a rule for implementing accurate interaction between the virtual object and the virtual prop becomes more complex, making it difficult to achieve accurate interaction. In addition, there may be different interaction actions between the virtual object and the plurality of interactive virtual props, so that the player cannot determine a specific virtual prop that the virtual object interacts with. In the related art, there is no interaction priority between interactive virtual props, there is no prompt for clarifying a virtual prop that is interacted with in a virtual scene, and there is no interaction mechanism set between the virtual object and the plurality of interactive virtual props. Therefore, it is difficult to achieve accurate interaction when there are a plurality of virtual props.

Embodiments of this application provide a prop interaction method and apparatus in a virtual scene, an electronic device, a non-transitory computer-readable storage medium, and a computer program product, which can recommend a to-be-interacted virtual prop to a user to improve the human-computer interaction efficiency. The following describes exemplary applications of the electronic device provided in the embodiments of this application. The electronic device provided in the embodiments of this application may be implemented as various types of user terminals such as a notebook computer, a tablet computer, a desktop computer, a set-top box, a mobile device (for example, a mobile phone, a portable music player, a personal digital assistant, a dedicated message device, a portable game device, or a virtual reality hardware device).

The prop interaction method in a virtual scene provided in the embodiments of this application may be applied to a virtual reality hardware device. The virtual scene may be outputted completely based on the virtual reality hardware device, or may be outputted based on collaboration between a terminal and a server. The server calculates scene displaying data of the virtual scene, where the scene displaying data includes prop displaying data of a first virtual prop in a selected state, and sends the scene displaying data to the virtual reality hardware device. In the virtual reality hardware device, at least part of a region including a virtual object in the virtual scene is displayed, at least two virtual props having an interaction function are displayed in the at least part of the region, the first virtual prop in the selected state in the at least two virtual props is displayed, and at least one interaction control corresponding to the first virtual prop is displayed. An interaction tool of the virtual reality hardware device receives a trigger operation by an account on the interaction control, the virtual reality hardware device sends operation data of the trigger operation to the server through a network, the server calculates response data of the interaction function corresponding to the interaction control based on the operation data, the server sends the response data to the virtual reality hardware device through the network, and an interaction process between the virtual object and the virtual prop is displayed on the virtual reality hardware device based on the response data.

For case of understanding of the prop interaction method in a virtual scene provided in the embodiments of this application, exemplary implementation scenarios of the prop interaction method in a virtual scene provided in the embodiments of this application are first described, and the virtual scene may be outputted completely based on a terminal, or may be outputted through collaboration between a terminal and a server.

In some embodiments, the virtual scene may be an environment for game characters to interact with each other, for example, an environment for the game characters to engage in a battle in the virtual scene.

Figure 2:
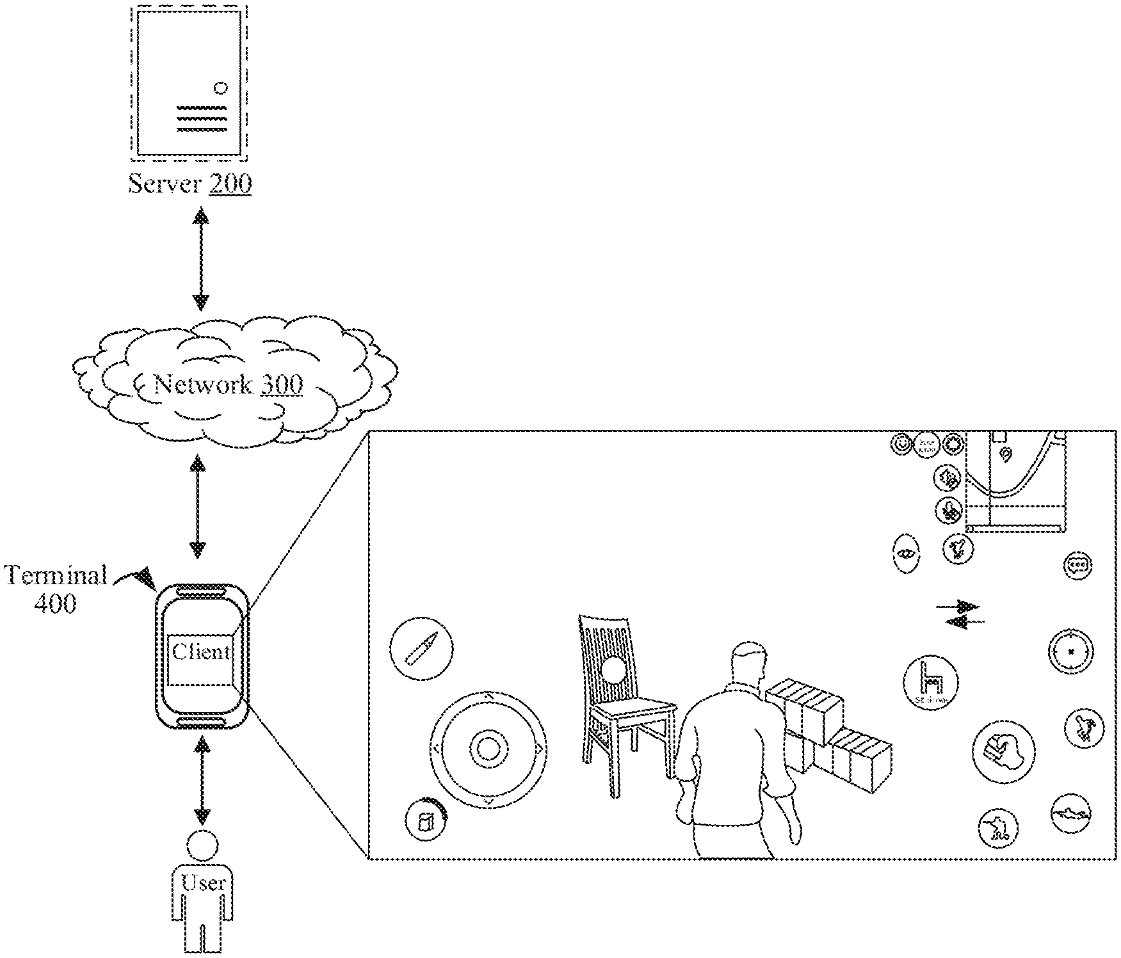
FIG. 2 is a schematic diagram of a structure of a prop interaction system in a virtual scene according to an embodiment of this application.

In an implementation scenario, referring to FIG. 2, FIG. 2 is a schematic diagram of an application mode of a prop interaction method in a virtual scene according to an embodiment of this application. The method is applied to a terminal 400 and a server 200. Generally, the application mode is an application mode suitable for completing virtual scene calculation depending on a calculation capability of the server 200 and outputting the virtual scene at the terminal 400.

For example, a user logs in to a client (such as a game application of a network version) run by the terminal 400 through an account, and the server 200 calculates scene displaying data of the virtual scene, where the scene displaying data includes prop displaying data of a first virtual prop in a selected state, and sends the scene displaying data to the terminal 400. In a human-computer interaction interface of the client, at least part of a region including a virtual object in the virtual scene is displayed, at least two virtual props having an interaction function are displayed in the at least part of the region, the first virtual prop in the selected state in the at least two virtual props is displayed, and at least one interaction control corresponding to the first virtual prop is displayed. The terminal 400 receives a trigger operation by the account on the interaction control, the terminal 400 sends operation data of the trigger operation to the server 200 through a network 300, the server 200 calculates response data of the interaction function corresponding to the interaction control based on the operation data, the server 200 sends the response data to the terminal 400 through the network 300, and an interaction process between the virtual object and the virtual prop is displayed in the human-computer interaction interface of the terminal 400 based on the response data.

For example, a user logs in to a client (such as a game application of a network version) run by the terminal 400 through an account, and the client calculates scene displaying data of the virtual scene, where the scene displaying data includes prop displaying data of a first virtual prop in a selected state. In a human-computer interaction interface of the client, at least part of a region including a virtual object in the virtual scene is displayed, at least two virtual props having an interaction function are displayed in the at least part of the region, the first virtual prop in the selected state in the at least two virtual props is displayed, and at least one interaction control corresponding to the first virtual prop is displayed. The terminal 400 receives a trigger operation by the account on the interaction control, the client calculates response data of the interaction function corresponding to the interaction control based on the operation data, and an interaction process between the virtual object and the virtual prop is displayed in the human-computer interaction interface of the terminal 400 based on the response data.

In some embodiments, the terminal 400 may implement the prop interaction method in a virtual scene provided in the embodiments of this application by running a computer program. For example, the computer program may be a native program or a software module in an operating system; a native application (APP), that is, a program that needs to be installed in the operating system for running, such as a game APP (that is, the foregoing client) or a live streaming APP; an applet, that is, a program that only needs to be downloaded to a browser environment for running; or a game applet that can be embedded in any APP. In summary, the foregoing computer program may be an application program, a module, or a plugin in any form.

The embodiments of this application may be implemented by a cloud technology. The cloud technology refers to a hosting technology that unifies a series of resources such as hardware, software, and a network in a wide area network or a local area network to realize data calculation, storage, processing, and sharing.

The cloud technology is a collective name of a network technology, an information technology, an integration technology, a management platform technology, an application technology, and the like based on an application of a cloud computing business mode, and may form a resource pool, which is used on demand, and is flexible and convenient. A cloud computing technology becomes an important support. A background service of a technical network system requires a large amount of computing and storage resources.

For example, the server 200 may be an independent physical server, or may be a server cluster including a plurality of physical servers or a distributed system, or may be a cloud server that provides basic cloud computing services such as a cloud service, a cloud database, cloud computing, a cloud function, cloud storage, a network service, cloud communication, a middleware service, a domain name service, a security service, CDN, big data, an artificial intelligence platform, and the like. The terminal 400 may be a smartphone, a tablet computer, a notebook computer, a desktop computer, a smart speaker, and a smart watch, but is not limited thereto. The terminal 400 and the server 200 may be directly or indirectly connected in a wired or wireless communication manner. This is not limited in the embodiments of this application.

Figure 3:
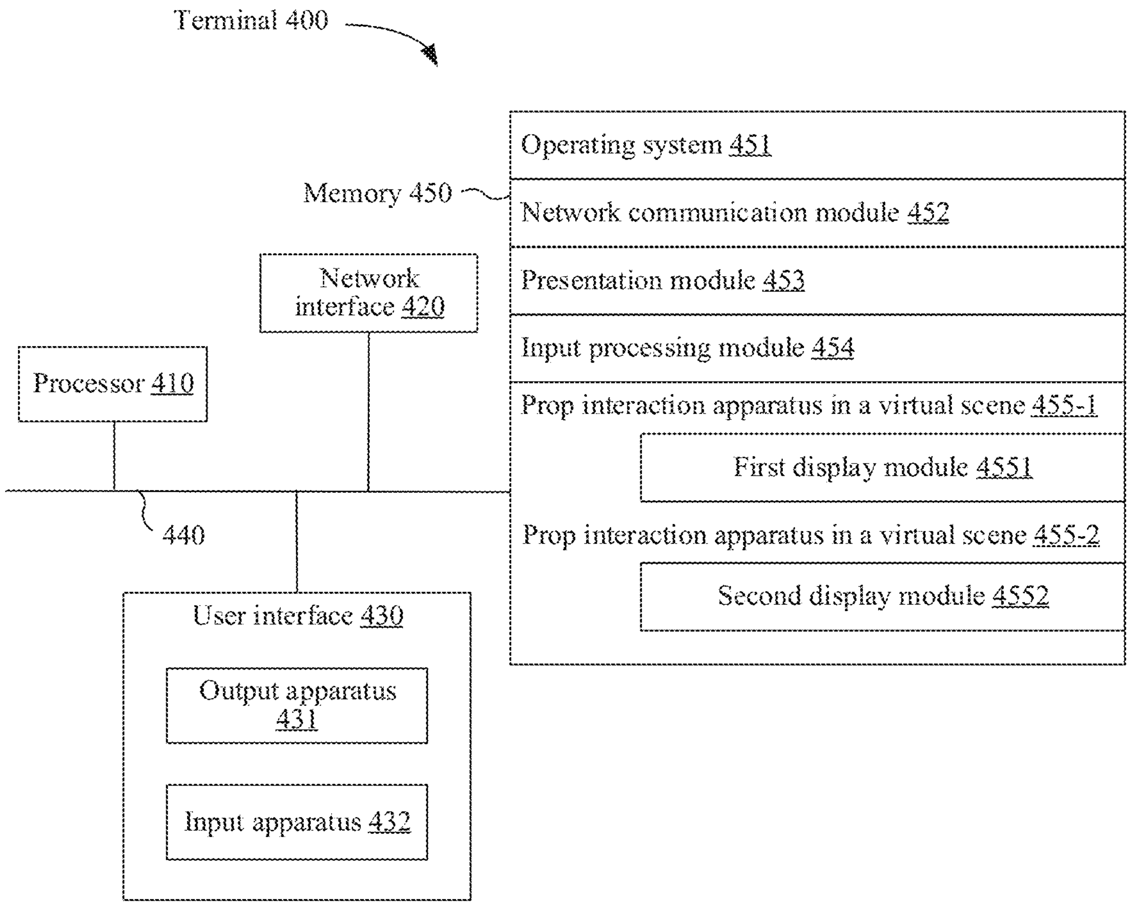
FIG. 3 is a schematic diagram of a structure of an electronic device according to an embodiment of this application.

Referring to FIG. 3, FIG. 3 is a schematic diagram of a structure of an electronic device to which a prop interaction method in a virtual scene is applied according to an embodiment of this application. Taking the electronic device being a terminal as an example for description, the terminal 400 shown in FIG. 3 includes at least one processor 410, a memory 450, at least one network interface 420, and a user interface 430. Various components in the terminal 400 are coupled together through a bus system 440. The bus system 440 is configured to implement connection and communication between these components. The bus system 440 further includes a power bus, a control bus, and a status signal bus in addition to a data bus. But for clear descriptions, various buses in FIG. 3 are all marked as the bus system 440.

The processor 410 may be an integrated circuit chip with a signal processing capability, for example, a general purpose processor, a digital signal processor (DSP) or another programmable logic device, a discrete gate or a transistor logic device, or a discrete hardware component, where the general purpose processor may be a microprocessor or any conventional processor.

The user interface 430 includes one or more output apparatuses 431 that can display media content, and the output apparatus includes one or more speakers and/or one or more visual display screens. The user interface 430 further includes one or more input apparatuses 432, and the input apparatus includes a user interface component that facilitates inputting of a user, such as a keyboard, a mouse, a microphone, a touch display screen, a camera, and other input buttons and controls.

The memory 450 may be removable, non-removable, or a combination thereof. For example, a hardware device includes a solid-state memory, a hard disk drive, an optical disc drive, and the like. The memory 450 may include one or more storage devices that are physically away from the processor 410.

The memory 450 includes a volatile memory or a non-volatile memory, or may include both a volatile memory and a non-volatile memory. The non-volatile memory may be a read only memory (ROM), and the volatile memory may be a random access memory (RAM). The memory 450 described in the embodiments of this application aims to include any suitable type of memories.

In some embodiments, the memory 450 can store data to support various operations, where examples of the data include a program, a module, and a data structure or a subset or superset thereof, which are described below by using examples.

An operating system 451 includes a system program for processing various basic system services and executing hardware-related tasks, for example, a framework layer, a core library layer, a driver layer, and is configured to implement various basic services and process hardware-based tasks.

A network communication module 452 is configured to reach another electronic device through one or more (wired or wireless) network interfaces 420. For example, the network interface 420 includes Bluetooth, wireless compatibility authentication (WiFi), a universal serial bus (USB), and the like.

A presentation module 453 is configured to present information through one or more output apparatuses 431 (such as a display screen and a speaker) associated with the user interface 430 (for example, a user interface for operating a peripheral device and displaying content and information).

An input processing module 454 is configured to detect one or more user inputs or interaction from one of the one or more input apparatuses 432 and translate the detected inputs or interaction.

In some embodiments, the prop interaction apparatus in a virtual scene provided in the embodiments of this application may be implemented in a software manner. FIG. 3 shows a prop interaction apparatus 455-1 in the virtual scene stored in the memory 450, where the prop interaction apparatus may be software in a form of a program or a plugin, including a first display module 4551. FIG. 3 further shows a prop interaction apparatus 455-2 in the virtual scene stored in the memory 450, where the prop interaction apparatus may be software in a form of a program or a plugin, including a second display module 4552. These modules are logical and may be combined in different manners or further split according to a function to be implemented. The following describes functions of the modules.

The following describes the prop interaction method in a virtual scene provided in the embodiments of this application with reference to exemplary applications and implementations of the terminal provided in the embodiments of this application.

The following describes the prop interaction method in a virtual scene provided in the embodiments of this application. As mentioned above, the electronic device that implements the prop interaction method in a virtual scene provided in the embodiments of this application may be a terminal device. Therefore, an entity performing various operations are not repeatedly described in the following description.

Figure 4A:
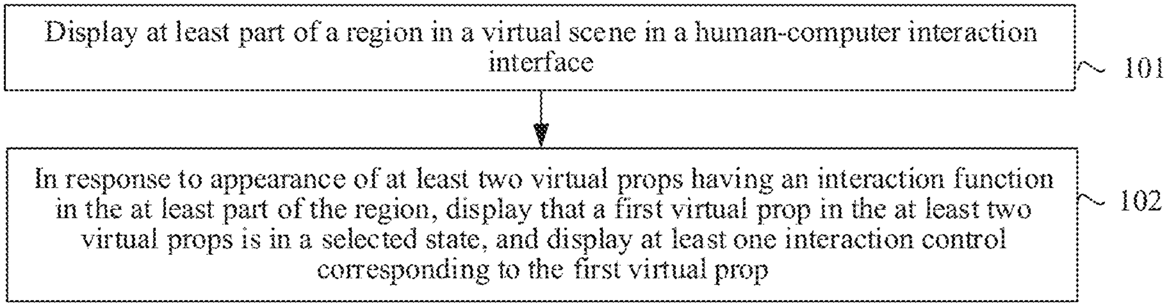
FIG. 4A to FIG. 4C are schematic flowcharts of a prop interaction method in a virtual scene according to an embodiment of this application.

Referring to FIG. 4A, FIG. 4A is a schematic flowchart of a prop interaction method in a virtual scene according to an embodiment of this application. The following describes the method with reference to Operation 101 and Operation 102 shown in FIG. 4A.

Operation 101: Display at least part of a region in the virtual scene in a human-computer interaction interface.

For example, the at least part of the region includes a virtual object, and the at least part of the region including the virtual object in the virtual scene may be displayed in the human-computer interaction interface, where the at least part of the region may be a whole region, or a partial region, and the virtual object may be completely displayed in the human-computer interaction interface (for example, a full body of the virtual object is displayed), or partly displayed in the human-computer interaction interface (for example, an upper body of the virtual object is displayed).

Operation 102: In response to appearance of at least two virtual props having an interaction function in the at least part of the region, choose a first virtual prop in the at least two virtual props to be in a selected state based on at least a spatial relationship between each of the least two virtual props and the virtual object and display them accordingly, and display at least one interaction control corresponding to the first virtual prop.

Figure 5A:
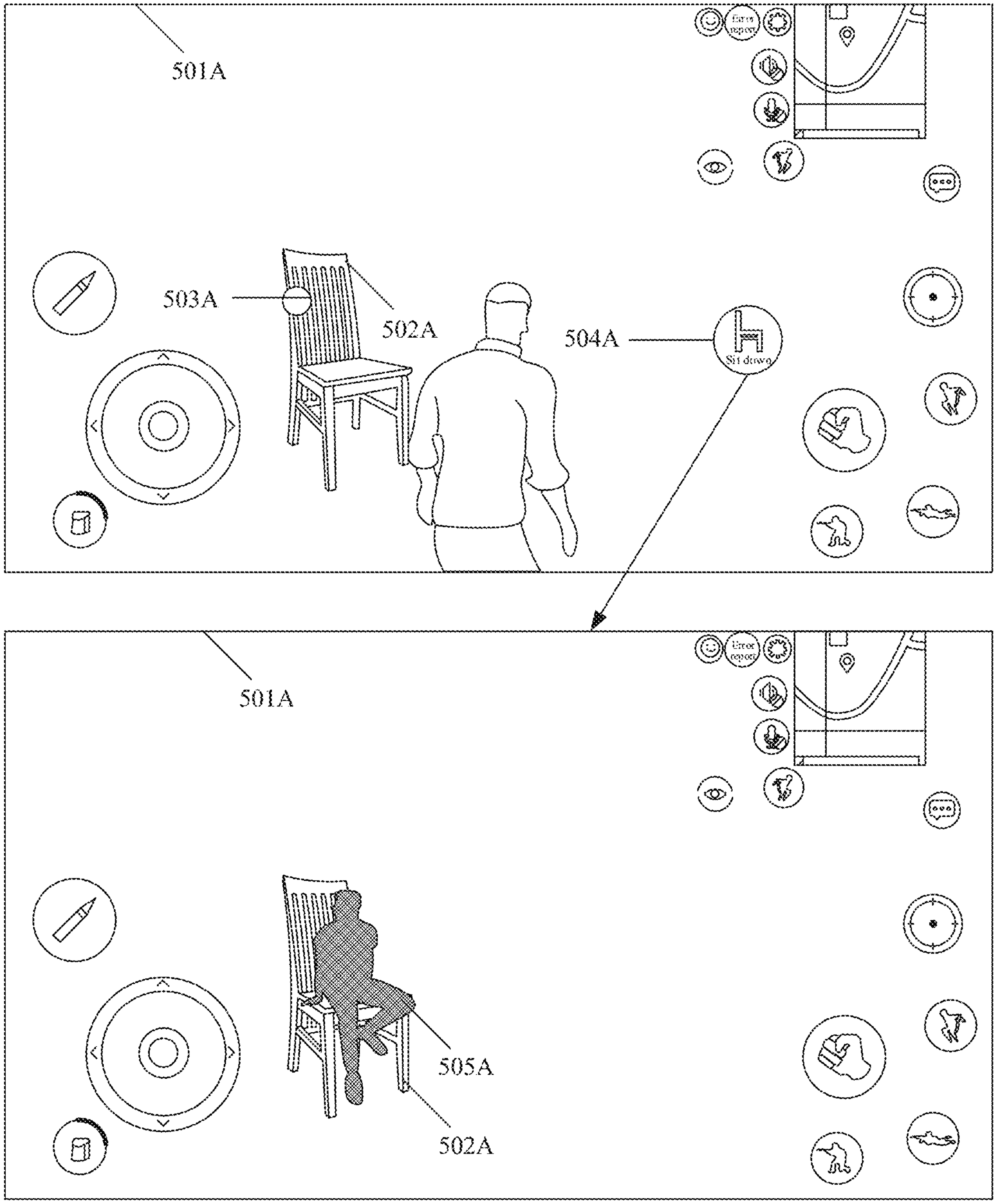
FIG. 5A to FIG. 5E are schematic diagrams of interfaces of a prop interaction method in a virtual scene according to an embodiment of this application.
Figure 5B:
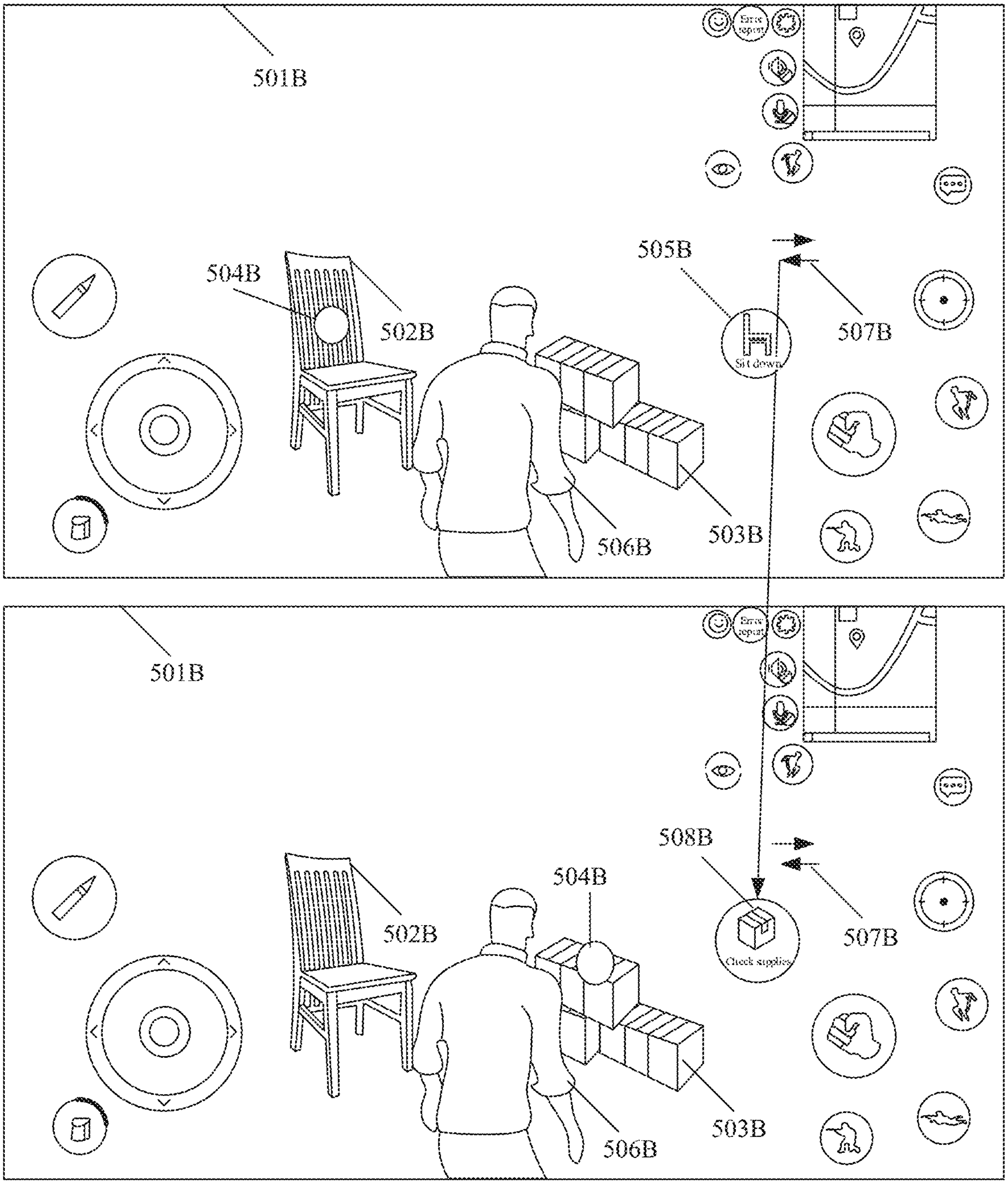

For example, referring to FIG. 5B, a chair 502B and a supply box 503B are displayed in a human-computer interaction interface 501B. The chair 502B and the supply box 503B are both virtual props. The chair 502B is the first virtual prop, and a selected mark 504B (representing that the chair is in the selected state) is displayed on the chair 502B. An interaction control 505B of the chair 502B is further displayed in the human-computer interaction interface. In response to a trigger operation on the interaction control 505B, a virtual object 506B sits on the chair 502B. A number of the first virtual props is one, the first virtual prop is displayed in the selected state, and a corresponding interaction control is displayed, thereby clarifying a virtual prop that is interacted with to the user.

For example, the interaction control is configured to be triggered to execute an interaction function corresponding to the interaction control, and the interaction function is configured for performing interaction between the virtual object and the first virtual prop. The first virtual prop may correspond to one interaction control or a plurality of interaction controls. For example, when the first virtual prop is a chair, the first virtual prop corresponds to a "sit down" interaction control, and when the "sit down" interaction control is triggered, the virtual object is controlled to sit on the chair. When the first virtual prop is a vehicle, the first virtual prop corresponds to a "drive" interaction control and a "take a ride" interaction control, and when the "drive" interaction control is triggered, the virtual object is controlled to enter a driver's seat of the vehicle.

For example, the at least two virtual props having the interaction function may be at any position in the part of the region, or the at least two virtual props having the interaction function may be within an interaction range of the virtual object, where the interaction range is a circle with the virtual object as a center and a specified distance as a radius.

For example, the interaction range of the virtual object is the at least part of the region displayed in the human-computer interaction interface, or the interaction range of the virtual object may be in the at least part of the region displayed in the human-computer interaction interface, that is, the interaction range of the virtual object is a subregion of the at least part of the region displayed in the human-computer interaction interface.

In response to the appearance of the at least two virtual props having the interaction function in the at least part of the region, that the first virtual prop in the at least two virtual props is in the selected state is displayed, and the at least one interaction control corresponding to the first virtual prop is displayed, so that the first virtual prop and the corresponding interaction control that are automatically selected are directly displayed to the user, a process that the user manually selects a virtual prop that needs to be interacted with currently is omitted, and the human-computer interaction efficiency may be effectively improved.

For example, in response to that an orientation of the virtual object in the virtual scene is changed or the virtual object moves in the virtual scene, that a third virtual prop in the at least two virtual props is in the selected state and the first virtual prop is in an unselected state is displayed. For example, a position of the virtual object changes, and the virtual object moves away from the first virtual prop and moves close to the third virtual prop. A distance between the virtual object and the first virtual prop is greater than a first distance threshold, and a distance between the virtual object and the third virtual prop is less than a second distance threshold. Therefore, a most suitable virtual prop for interacting with the virtual object changes from the first virtual prop to the third virtual prop, so that the third virtual prop is automatically in the selected state, while the first virtual prop is in the unselected state. In the embodiments of this application, according to a positional and directional relationship between the virtual object and the virtual prop, an automatically selected virtual prop is adaptively adjusted, improving the human-computer interaction efficiency and an intelligence degree of the virtual scene.

In some embodiments, in response to the appearance of the at least two virtual props having the interaction function in the part of the region, a first display mode is applied to the at least two virtual props in the at least part of the region, where a significance degree of the first display mode is positively correlated with a feature value of each of the at least two virtual props, and the feature value includes one of the following: a usage frequency of the virtual prop, a distance between the virtual prop and the virtual object, and an orientation angle between the virtual prop and the virtual object. By applying first display modes in different display degrees to virtual props, a difference between the virtual props may be presented, and richer information may be prompted to the user, such as comparative information of the usage frequency and comparative information of the distance, so that the player obtains richer information through the human-computer interaction interface, which is beneficial for improving user experience and the information display efficiency.

For example, the orientation angle of the virtual object may be obtained through the following method: obtaining a first connection line between the virtual prop and the virtual object, obtaining a first ray with the virtual object as an endpoint and facing a crosshair direction (the orientation of the virtual object), and determining an angle between the first connection line and the first ray as the orientation angle between the virtual prop and the virtual object, where the orientation angle represents a deviation degree of the virtual prop relative to the virtual object.

For example, the virtual prop in the human-computer interaction interface may be displayed according to the first display mode. For example, the first display mode may be applying a contour processing special effect to the virtual prop, where the contour processing special effect is a special effect that deepens lines of the virtual prop. Referring to FIG. 5D, a chair 502D and a supply box 503D are displayed in a human-computer interaction interface 501D. Both the chair and the supply box are virtual props. A significance degree of the chair is higher than a significance degree of the supply box. For example, a usage frequency of the chair is higher than a usage frequency of the supply box, so that the significance degree of the chair is higher than the significance degree of the supply box, or a distance between the chair and the virtual object is greater than a distance between the supply box and the virtual object, so that the significance degree of the chair is higher than the significance degree of the supply box.

In some embodiments, in response to the appearance of the at least two virtual props having the interaction function in the part of the region, the first display mode is applied to the at least two virtual props in the human-computer interaction interface, and a second display mode is applied to another virtual prop in the human-computer interaction interface, where the second display mode is different from the first display mode, and the another virtual prop does not have the interaction function. By applying different display modes to virtual props having the interaction function and not having the interaction function, the player may be reminded to focus on the virtual prop having the interaction function, so that the player obtains richer information through the human-computer interaction interface, which is benefit for improving user experience and the information displaying efficiency.

Figure 5C:
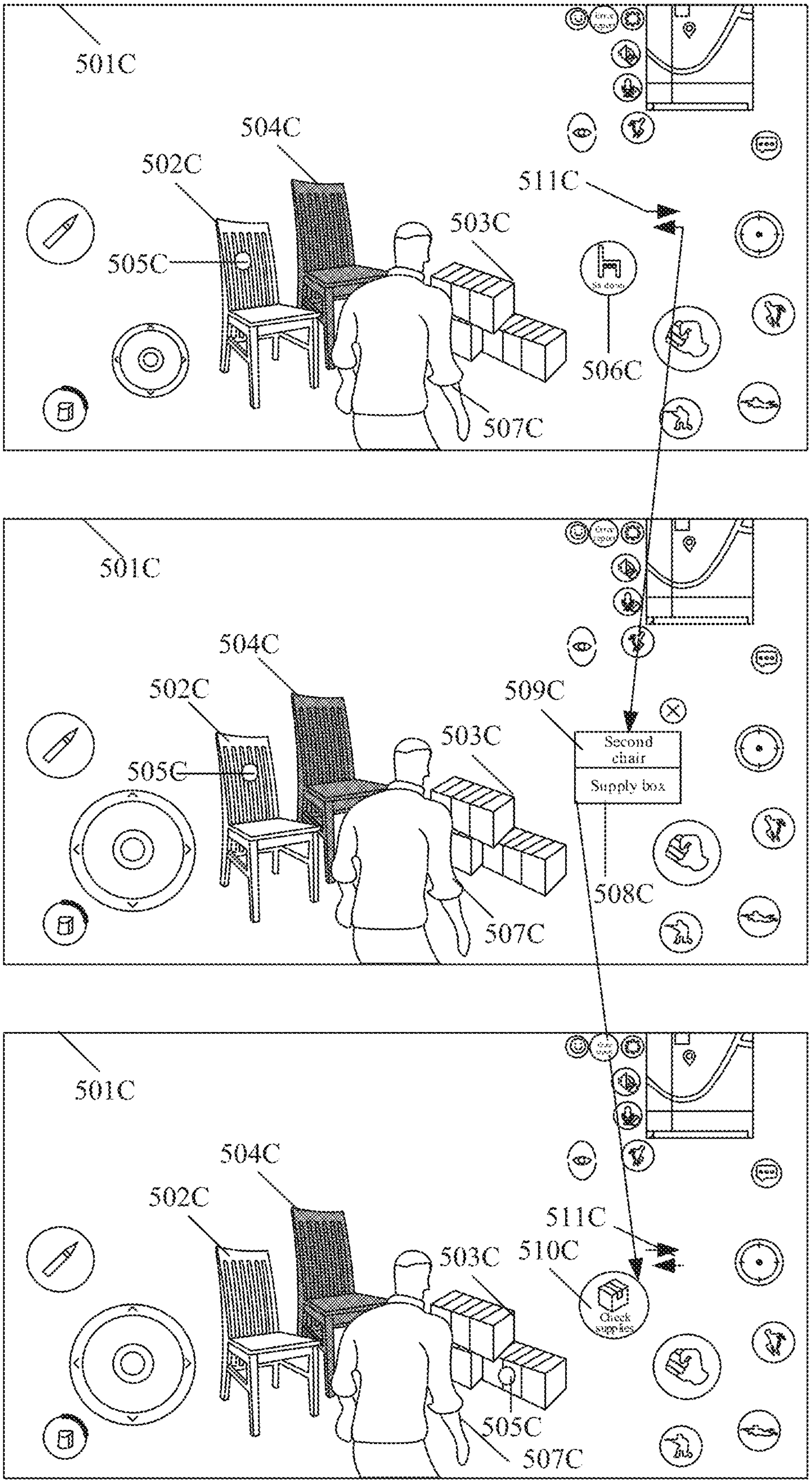
Figure 5D:
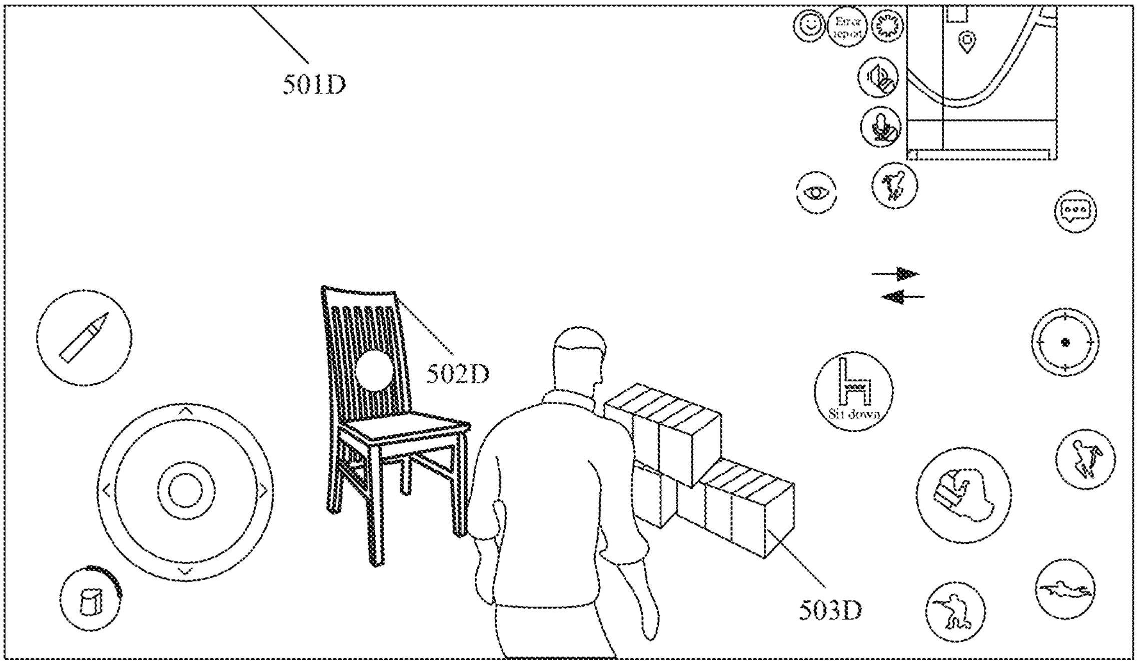
Figure 5E:
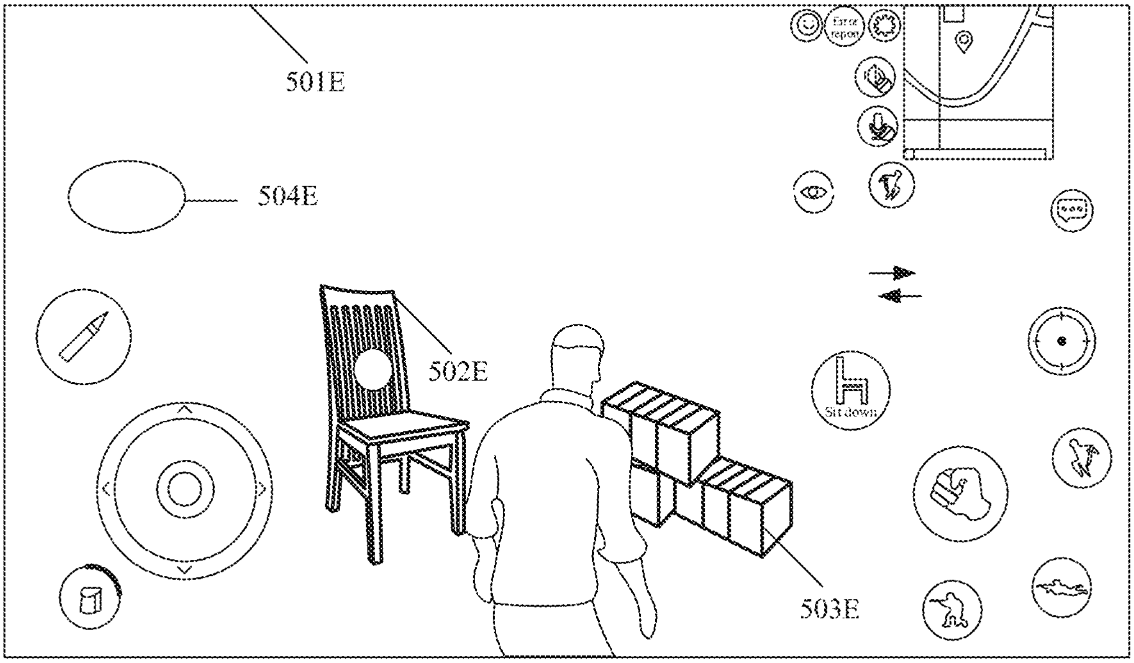

For example, referring to FIG. 5E, a chair 502E and a supply box 503E are displayed in a human-computer interaction interface 501E, and a stone 504E is further displayed in the human-computer interaction interface, where the chair 502E and the supply box 503E are virtual props having an interaction function (the chair 502E and the supply box 503E are first virtual props), and the stone 504E is another virtual prop not having the interaction function (the stone 504E is the another virtual prop). Therefore, the first display mode based on the contour processing special effect is applied to the chair 502E and the supply box 503E, and the second display mode without the contour processing special effect is applied to the stone 504E, where the first display mode is not limited to the contour processing special effect, provided that the first display mode is different from the second display mode.

In some embodiments, before the displaying that a first virtual prop in the at least two virtual props is in a selected state, the method further includes: determining a first fan-shaped region with the virtual object as a center of a circle, a set distance as a radius, and a first angle as a central angle, where an orientation of the virtual object coincides with an angular bisector of the central angle of the first fan-shaped region; determining at least one first candidate virtual prop that overlaps with the first fan-shaped region, where a projection region of the first candidate virtual prop on a ground in the virtual scene overlaps with the first fan-shaped region; and determining one first candidate virtual prop in the at least one first candidate virtual prop as the first virtual prop.

Figure 8A:
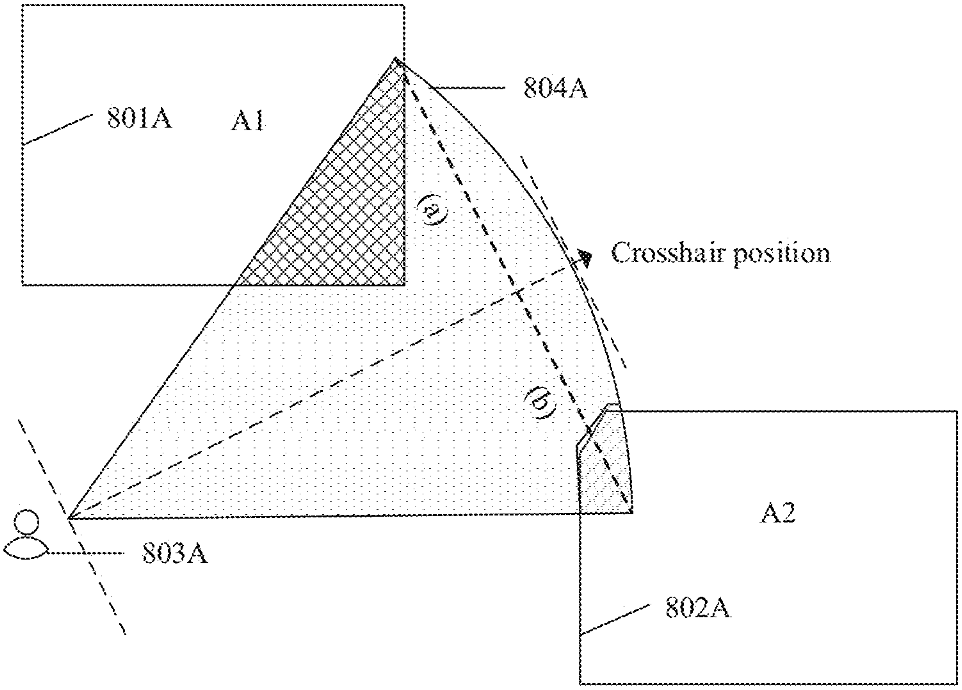
FIG. 8A to FIG. 8E are schematic diagrams of calculating an overlapping region in a prop interaction method in a virtual scene according to an embodiment of this application.

For example, referring to FIG. 8A, the ground is a plane formed by X and Y coordinate axes, a first fan shape 804A (a crosshair view) with a position of a virtual object 803A as a center of a circle and a set distance r as a radius is obtained, where a region occupied by the first fan shape is the first fan-shaped region, and a ray of the virtual object facing a crosshair direction (that is, the orientation of the virtual object) is an angular bisector of the first fan shape. FIG. 8A shows a projection 801A of a virtual prop A1 on the ground in the virtual scene and a projection 802A of a virtual prop A2 on the ground in the virtual scene. Since projections of only two virtual props overlap with the first fan shape 804A, this represents that two first candidate virtual props are in the crosshair view. One first candidate virtual prop in the two first candidate virtual props is determined as the first virtual prop. For example, the virtual prop A1 corresponding to the projection 801A shown in FIG. 8A is determined as the first virtual prop.

In some embodiments, the determining one first candidate virtual prop in the at least one first candidate virtual prop as the first virtual prop may be implemented through the following technical solution: when the first fan-shaped region includes one first candidate virtual prop, determining the first candidate virtual prop as the first virtual prop; when the first fan-shaped region includes two first candidate virtual props, determining a first candidate virtual prop with a larger area in a first overlapping region as the first virtual prop, where the first overlapping region is an overlapping region between the first candidate virtual prop and the first fan-shaped region; and when the first fan-shaped region includes at least three first candidate virtual props, performing the following processing: determining a second fan-shaped region with the virtual object as a center of a circle, the set distance as a radius, and a second angle as a central angle, where the orientation of the virtual object coincides with an angular bisector of the central angle of the second fan-shaped region, and the second angle is smaller than the first angle; determining at least one second candidate virtual prop that overlaps with the second fan-shaped region, where a projection region of the second candidate virtual prop on the ground in the virtual scene overlaps with the second fan-shaped region; and determining a second candidate virtual prop with a largest area in a second overlapping region as the first virtual prop, where the second overlapping region is an overlapping region between the second candidate virtual prop and the second fan-shaped region. In the embodiments of this application, the recommended first virtual prop may be clarified in various scenes and environments, and the first virtual prop is a most convenient virtual prop for operation by the player, which omits a process that the player tries out a virtual prop that is inconvenient to interact with, thereby effectively improving user experience and the human-computer interaction efficiency.

For example, referring to FIG. 8A, the ground is a plane formed by X and Y coordinate axes, a first fan shape 804A (a crosshair view) with a position of a virtual object 803A as a center of a circle and a set distance r as a radius is obtained, where a region occupied by the first fan shape is the first fan-shaped region, and a ray of the virtual object facing a crosshair direction (that is, the orientation of the virtual object) is an angular bisector of the first fan shape. FIG. 8A shows a projection 801A of a virtual prop A1 on the ground in the virtual scene and a projection 802A of a virtual prop A2 on the ground in the virtual scene. Since projections of only two virtual props overlap with the first fan shape 804A, this represents that two first candidate virtual props are in the crosshair view. One first candidate virtual prop in the two first candidate virtual props is determined as the first virtual prop. The virtual object interacts with a first candidate virtual prop that has a larger projection proportion in the crosshair view. Therefore, a first candidate virtual prop whose projection has a larger overlapping area with the first fan-shaped region may be directly determined as the first virtual prop that is interacted with. For example, the virtual prop A1 corresponding to the projection 801A shown in FIG. 8A is determined as the first virtual prop that is interacted with.

Figure 8B:
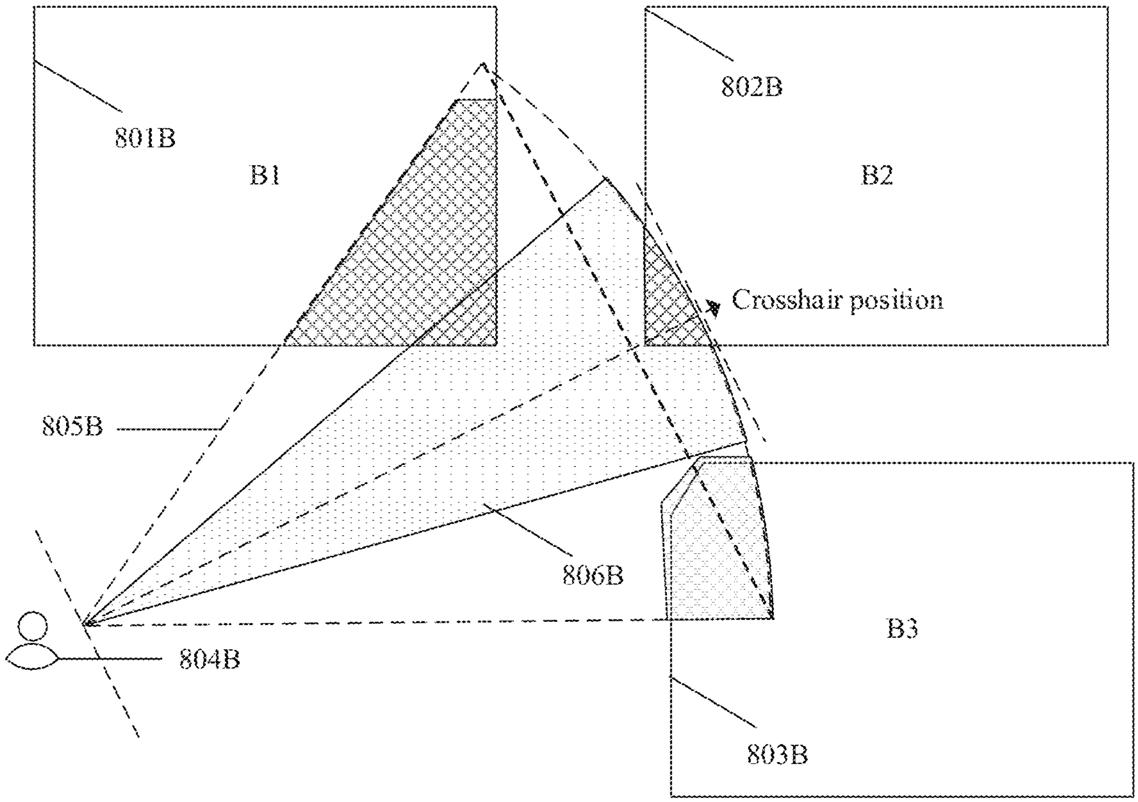

For example, referring to FIG. 8B, the ground is a plane formed by X and Y coordinate axes, a first fan shape 805B (a first crosshair view) with a position of a virtual object 804B as a center of a circle and a set distance r as a radius is obtained, where a region occupied by the first fan shape is the first fan-shaped region, and a ray of the virtual object facing a crosshair direction (that is, the orientation of the virtual object) is an angular bisector of the first fan shape 805B. FIG. 8B shows a projection 801B of a virtual prop B1 on the ground in the virtual scene, a projection 802B of a virtual prop B2 on the ground in the virtual scene, and a projection 803B of a virtual prop B3 on the ground in the virtual scene. Since projections of three first candidate virtual props overlap with the first fan shape 805B, this represents that at least three first candidate virtual props are in the first crosshair view. Therefore, a second crosshair view may be obtained to determine the first candidate virtual prop that is interacted with, and a second fan shape 806B with the position of the virtual object 804B as a center of a circle and the set distance r as a radius is obtained, where a region occupied by the second fan shape is the second fan-shaped region, a ray of the virtual object facing the crosshair direction (that is, the orientation of the virtual object) is an angular bisector of the second fan shape 806B, and the second fan shape is smaller than the first fan shape (the central angle of the second fan shape is smaller than the central angle of the first fan shape). The virtual prop B1, the virtual prop B2, and the virtual prop B3 are all in the first crosshair view, the virtual prop B1 and the virtual prop B2 are both in the second crosshair view, and the virtual prop B3 is not in the second crosshair view. Therefore, the virtual prop B1 and the virtual prop B2 are second candidate virtual props, and a second candidate virtual prop whose projection has a largest overlapping area with the second fan-shaped region may be directly determined as the first virtual prop that is interacted with, that is, the second candidate virtual prop B2 corresponding to the projection 802B shown in FIG. 8B is determined as the first virtual prop that is interacted with.

In some embodiments, before the displaying that a first virtual prop in the at least two virtual props is in a selected state, any of the following processing is performed: performing sorting processing on the at least two virtual props according to a usage frequency, and determining a virtual prop ranked first as the first virtual prop, where the usage frequency is a usage frequency of a current virtual object or usage frequencies of all virtual objects; performing sorting processing on the at least two virtual props according to a scene distance, and determining a virtual prop ranked first as the first virtual prop, where the scene distance is a distance between the virtual prop and the virtual object in the virtual scene; or performing sorting processing on the at least two virtual props according to latest usage time, and determining a virtual prop ranked first as the first virtual prop, where the latest usage time is a moment at which the virtual object uses the virtual prop last time. Through the foregoing sorting manners, the first virtual prop that needs to be displayed in the selected state may be clearly defined. The user does not need to manually choose a virtual prop, so that the human-computer interaction efficiency is improved, and only an interaction control of the virtual prop ranked first is displayed, improving the utilization of display resources.

For example, the sorting processing may be in ascending order or descending order. To recommend a best first virtual prop to the user, when sorting is performed based on the usage frequency and the latest usage time, sorting processing in descending order may be adopted, and when sorting is performed based on the scene distance, sorting processing in ascending order may be adopted. In other words, the first virtual prop is a virtual prop with a highest usage frequency in the at least two virtual props, or a virtual prop closest to the virtual object in the at least two virtual props, or a virtual prop most recently used by the virtual object in the at least two virtual props.

In some embodiments, before the displaying that a first virtual prop in the at least two virtual props is in a selected state, the method further includes: obtaining historical interaction data and a prop parameter of each of the at least two virtual props in the virtual scene, where the historical interaction data of each virtual prop includes a scene parameter for each use of the virtual prop; performing the following processing through a first neural network model: extracting a scene feature from the scene parameter, and extracting a prop feature is extracted from the prop parameter; performing fusion processing on the scene feature and the prop feature to obtain a first fused feature; and mapping the first fused feature into a first probability of each virtual prop adapting to the virtual scene; and performing sorting processing on the at least two virtual props in descending order of the first probability, and determining a virtual prop ranked first as the first virtual prop. An intelligence degree and accuracy of displaying an interaction control of the first virtual prop may be improved through a neural network model, effectively improving interaction efficiency between the user and the virtual prop, and by only displaying an interaction control of the virtual prop ranked first, the utilization efficiency of display resources may be effectively improved.

For example, the historical interaction data of each virtual prop includes the scene parameter for each use of the virtual prop, where the scene parameter includes combat data, environment data, status data of the virtual object, and the like, and the prop parameter is a parameter of the virtual prop itself, for example, use of the virtual prop and the like.

The following introduces how to train the neural network model. A sample scene parameter and a sample prop parameter of each sample virtual prop are collected from a sample virtual scene, a training sample is constructed according to the sample scene parameter and the sample prop parameter that are collected, the training sample is used as an input of a to-be-trained neural network model, and whether the sample virtual prop is a virtual prop that is used in the sample virtual scene is used as label data. When a plurality of virtual props are displayed at the same time, and the sample virtual prop is used preferentially, a label of the sample virtual prop is 1; and when a plurality of virtual props are displayed at the same time, and the sample virtual prop is not used preferentially, the label of the sample virtual prop is 0. The to-be-trained neural network model is trained based on the training sample and the label data, so that whether a virtual prop is used as a recommended first virtual prop may be determined directly through the first neural network model subsequently.

Figure 4B:
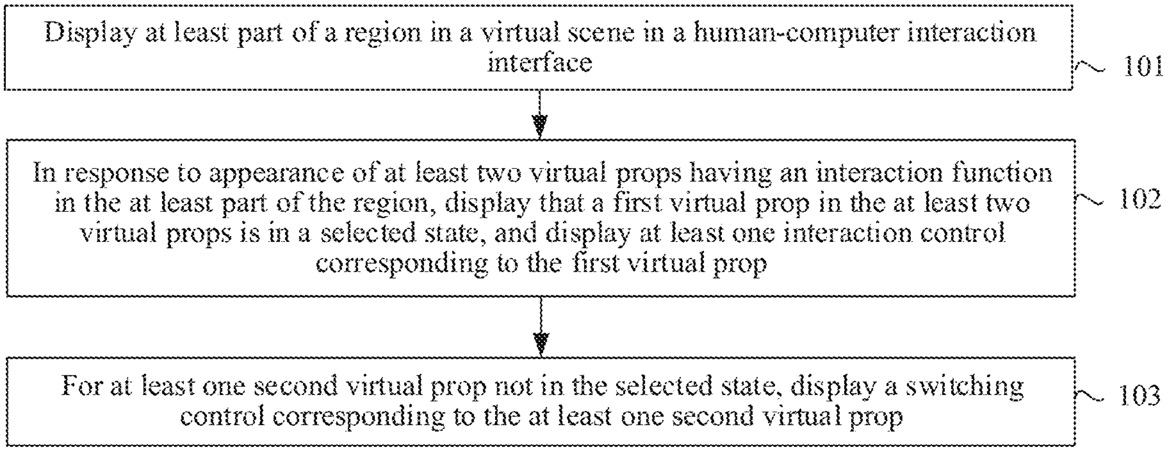

In some embodiments, referring to FIG. 4B, FIG. 4B is a schematic flowchart of a prop interaction method in a virtual scene according to an embodiment of this application. Based on FIG. 4A, operation 103 in FIG. 4B may be further performed.

Operation 103: For at least one second virtual prop not in the selected state, display a switching control corresponding to the at least one second virtual prop.

For example, the second virtual prop has the interaction function, and the switching control is configured to be triggered to display an interaction control corresponding to the at least one second virtual prop.

In some embodiments, when there is one second virtual prop not in the selected state, in response to a trigger operation on the switching control, at least one interaction control of the second virtual prop is displayed (displaying that the second virtual prop is in the selected state and the first virtual prop is in the unselected state), and the at least one interaction control of the first virtual prop is hidden. In the embodiments of this application, switching between displaying of interaction controls of two virtual props is implemented, so that interaction with a plurality of virtual props can be implemented through one interaction control.

For example, the second virtual prop may correspond to one interaction control or a plurality of interaction controls. For example, when the second virtual prop is a chair, the second virtual prop corresponds to a “sit down” interaction control, and when the “sit down” interaction control is triggered, the virtual object is controlled to sit on the chair. When the second virtual prop is a vehicle, the second virtual prop corresponds to a "drive" interaction control and a "take a ride" interaction control, and when the "drive" interaction control is triggered, the virtual object is controlled to enter a driver's seat of the vehicle.

For example, referring to FIG. 5B, a chair 502B and a supply box 503B are displayed in a human-computer interaction interface 501B. A selected mark 504B is displayed on the chair 502B (representing that the chair is in the selected state), so that the chair 502B is a first virtual prop; and the selected mark 504B is not displayed on the supply box 503B (representing that the supply box is not in the selected state), so that the supply box 503B is a second virtual prop. An interaction control 505B of the chair 502B is further displayed in the human-computer interaction interface, and in response to a trigger operation on a switching control 507B, in the human-computer interaction interface, the interaction control 505B of the chair 502B is hidden, an interaction control 508B of the supply box 503B is displayed, and the selected mark 504B is displayed on the supply box 503B.

In some embodiments, when there are a plurality of second virtual props not in the selected state, in response to a trigger operation on the switching control, prop identifiers (for example, identifier controls) in one-to-one correspondence with the plurality of second virtual props are displayed; and in response to a trigger operation on any prop identifier, at least one interaction control of a second virtual prop corresponding to the triggered prop identifier is displayed (displaying that the second virtual prop is in the selected state and the first virtual prop is in the unselected state), and the at least one interaction control of the first virtual prop is hidden. In the embodiments of this application, switching among displaying of interaction controls of at least three virtual props is implemented, so that interaction with a plurality of virtual props can be implemented through a limited number of controls.

For example, referring to FIG. 5C, a first chair 502C, a supply box 503C, and a second chair 504C are displayed in a human-computer interaction interface 501C. A selected mark 505C is displayed on the first chair 502C. The first chair 502C is a first virtual prop, and the supply box 503C and the second chair 504C are second virtual props. An interaction control 506C of the first chair 502C is further displayed in the human-computer interaction interface. In response to a trigger operation on a switching control 511C, in the human-computer interaction interface, the interaction control 506C of the first chair 502C is hidden, and an identifier control 508C of the supply box 503C and an identifier control 509C of the second chair are displayed. In response to a trigger operation on the identifier control 508C for the supply box 503C, the selected mark 505C is displayed on the supply box 503C, and in the human-computer interaction interface, the identifier control 508C of the supply box 503C and the identifier control 509C of the second chair are hidden, and an interaction control 510C of the supply box 503C is displayed.

In some embodiments, the displaying prop identifiers in one-to-one correspondence with the plurality of second virtual props may be implemented by the following technical solutions: displaying the prop identifiers (for example, identifier controls) in one-to-one correspondence with the plurality of second virtual props according to a set order, where a number of the plurality of second virtual props is any one of the following: a set number (the set number may be an average value of numbers of the second virtual props in a plurality of historical virtual scenes), a number positively correlated with a dimension of the human-computer interaction interface, a number positively correlated with an area of an idle region in the virtual scene, or a number positively correlated with a prop number of the second virtual props. By displaying the prop identifier of the second virtual prop, recommendation may be formed to the user, and the utilization of display resources is effectively improved.

For example, a description is made by using an example in which a number of second virtual props in the unselected state is five, that is, there are five second virtual props in the unselected state in the virtual scene. Referring to FIG. 5C, in response to a trigger operation on the switching control 511C, in the human-computer interaction interface, the interaction control 506C of the first chair 502C is hidden, and the identifier control 508C of the supply box 503C and the identifier control 509C of the second chair are displayed. In this case, the number of the plurality of second virtual props is 2, this represents that prop identifiers of only two second virtual props are displayed for the five second virtual props in the unselected state, and a number of second virtual props displayed with the prop identifier may be the set number. The number may further be positively correlated with the dimension of the human-computer interaction interface, and a larger dimension of the human-computer interaction interface indicates more second virtual props displayed with the prop identifier. For example, when the dimension of the human-computer interaction interface is larger than a dimension of a current human-computer interaction interface, prop identifiers of four second virtual props may be displayed for the five second virtual props. The number may further be positively correlated with the area of the idle region in the virtual scene, a larger area of the idle region in the virtual scene indicates more second virtual props displayed with the prop identifier in the human-computer interaction interface. For example, when the area of the idle region in the virtual scene is greater than an area of an idle region in a current virtual scene, prop identifiers of four second virtual props may be displayed for the five second virtual props. The number may further be positively correlated with the prop number of the second virtual props, and a greater prop number of the second virtual props indicates more second virtual props displayed with the prop identifier. For example, prop identifiers of three second virtual props may be displayed for the five second virtual props, and prop identifiers of two second virtual props may be displayed for four second virtual props.

In some embodiments, the set order is any one of the following: a descending order or an ascending order of usage frequencies of the second virtual props; an ascending order or a descending order of scene distances of the second virtual props, where the scene distance is a distance between the virtual prop and the virtual object in the virtual scene; an order from near to far or an order from far to near of latest usage time of the second virtual props, where the latest usage time is a moment at which the virtual object uses the second virtual prop last time; or an ascending order or a descending order of interaction efficiency between the second virtual props and the virtual object. Through the foregoing sorting manners, a second virtual prop whose prop identifier needs to be displayed to participate in switching may be clearly defined, and displaying in an order may prompt richer prop information to the player, improving the human-computer interaction efficiency.

For example, the sorting processing may be in ascending order or descending order. To recommend a virtual prop that meets an interest of the user, when sorting is performed based on the usage frequency, the latest usage time, and the interaction efficiency, sorting processing in descending order may be adopted, and when sorting is performed based on the scene distance, sorting processing in ascending order may be adopted. In other words, the second virtual prop displayed with the prop identifier is a virtual prop with a higher usage frequency in the second virtual props in the unselected state, or a second virtual prop closer to the virtual object in the second virtual props in the unselected state, or a second virtual prop used by the virtual object in a recent period of time in the second virtual props in the unselected state, or a second virtual prop with higher interaction efficiency in the second virtual props in the unselected state. To improve the usage diversity of the virtual prop, when sorting is performed based on the usage frequency, the latest usage time, and the interaction efficiency, sorting processing in ascending order may be adopted, and when sorting is performed based on the scene distance, sorting processing in descending order may be adopted. In other words, the second virtual prop displayed with the prop identifier is a virtual prop with a lower usage frequency in the second virtual props in the unselected state, or a second virtual prop further away from the virtual object in the second virtual props in the unselected state, or a second virtual prop not used by the virtual object in a recent period of time in the second virtual props in the unselected state, or a second virtual prop with lower interaction efficiency in the second virtual props in the unselected state.

In some embodiments, the method further includes: determining a second fan-shaped region with the virtual object as a center of a circle, the set distance as a radius, and a second angle as a central angle, where the orientation of the virtual object coincides with an angular bisector of the central angle of the second fan-shaped region, and the second angle is smaller than the first angle; and obtaining a third overlapping region between each second virtual prop and the second fan-shaped region, where the third overlapping region is an overlapping region between a projection region of the second virtual prop on a ground in the virtual scene and the second fan-shaped region, and obtaining interaction efficiency positively correlated with an area of the third overlapping region.

Figure 8C:
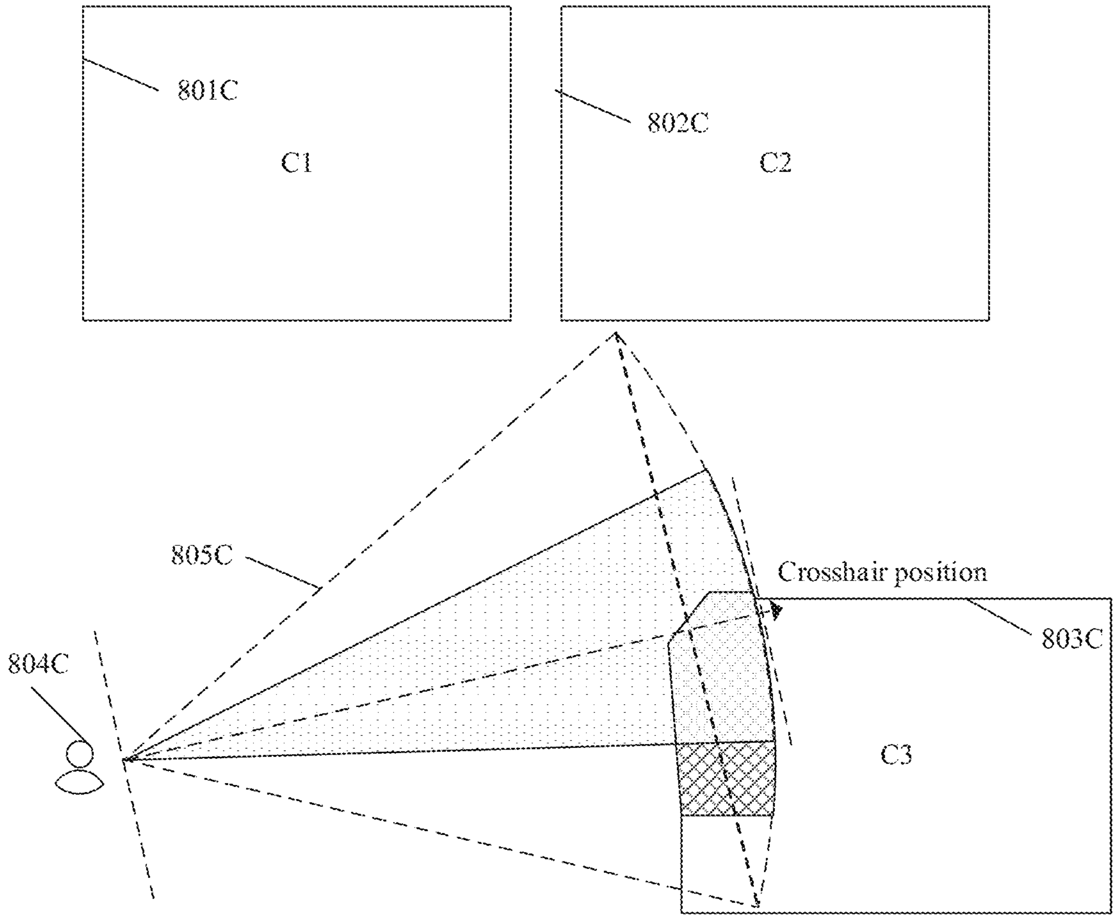
Figure 8D:
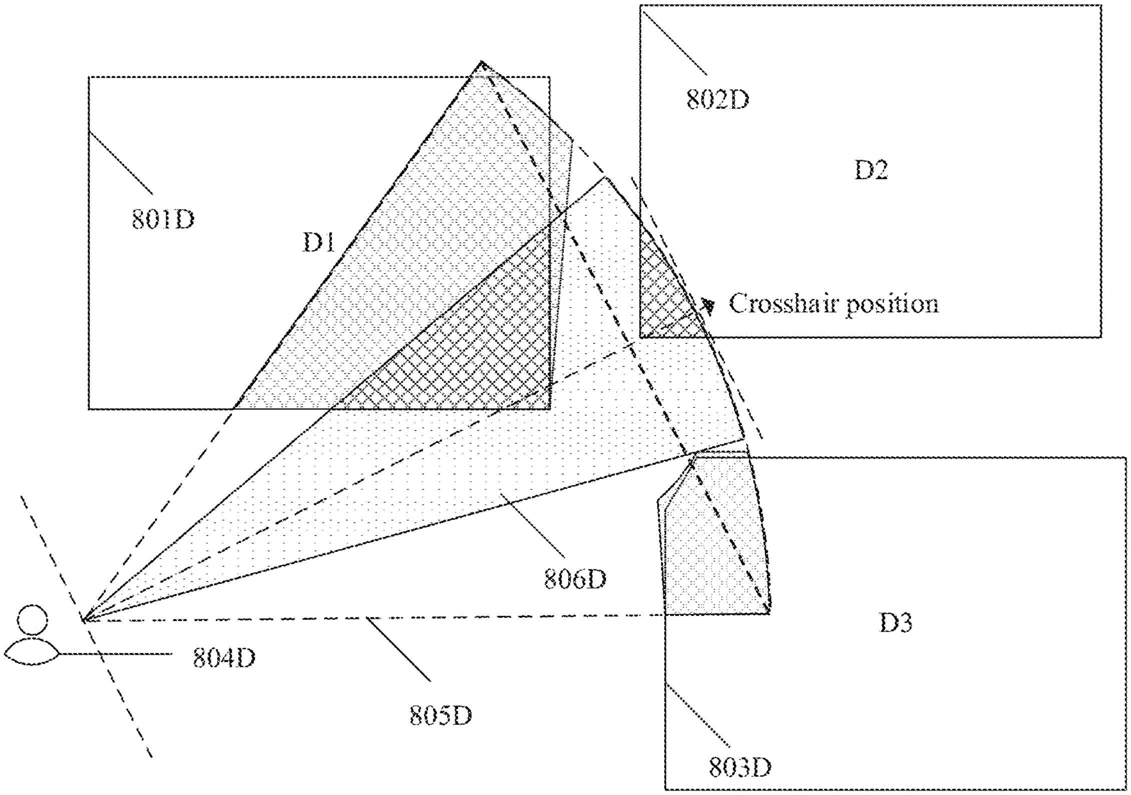
Figure 8E:
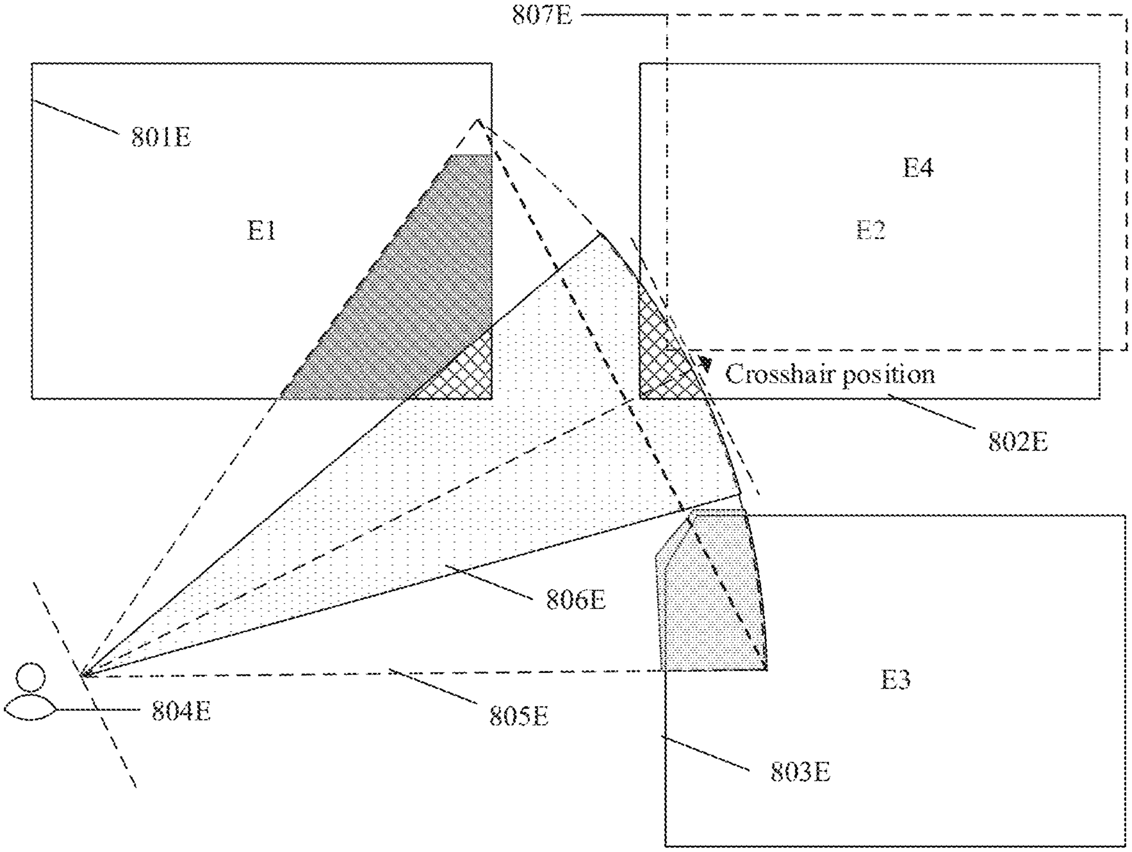

For example, referring to FIG. 8E, a projection 801E of a virtual prop E1 on the ground in the virtual scene, a projection 802E of a virtual prop E2 on the ground in the virtual scene, a projection 803E of a virtual prop E3 on the ground in the virtual scene, and a projection 807E of a virtual prop E4 on the ground in the virtual scene are shown in FIG. 8E, where the virtual prop E2 and the virtual prop E4 are in an overlapped state in a Z-axis. A second fan shape 806E (a second crosshair view) with the virtual object 804E as a center of a circle and a set distance r as a radius is obtained, where a region occupied by the second fan shape 806E is the second fan-shaped region, and a ray of the virtual object facing a crosshair direction (the orientation of the virtual object) is an angular bisector of the second fan shape 806E. The virtual prop E1, the virtual prop E2, and the virtual prop E4 are all in the second crosshair view. A virtual prop whose projection has a largest overlapping area with the second fan shape may be directly determined as the first virtual prop that is interacted with. That is, the virtual prop E2 corresponding to the projection 802E shown in FIG. 8E is determined as the first virtual prop that is interacted with. The virtual prop E1 corresponding to the projection 801E and the virtual prop E4 corresponding to the projection 804E are determined as second virtual props, and since an area of the third overlapping region corresponding to the projection 801E is greater than an area of the third overlapping region corresponding to the projection 804E, the interaction efficiency of the virtual prop E1 is higher than the interaction efficiency of the virtual prop E4.

Figure 4C:
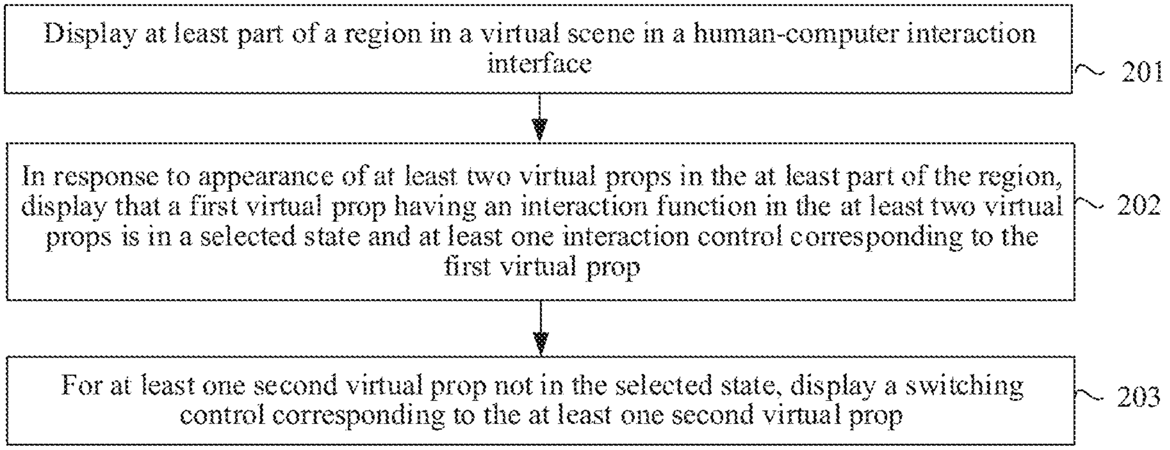

In some embodiments, referring to FIG. 4C, FIG. 4C is a schematic diagram of a flowchart of a prop interaction method in a virtual scene according to an embodiment of this application. The following describes the method with reference to Operation 201 to Operation 203 shown in FIG. 4C.

Operation 201: Display at least part of a region in the virtual scene in a human-computer interaction interface.

For example, the at least part of the region includes a virtual object.

Operation 202: In response to appearance of at least two virtual props in the at least part of the region, display, based on a selected state, a first virtual prop having an interaction function in the at least two virtual props and at least one interaction control corresponding to the first virtual prop.

For example, the interaction control is configured to be triggered to execute the interaction function corresponding to the interaction control, and the interaction function is configured for performing interaction between the virtual object and the first virtual prop.

Operation 203: For at least one second virtual prop not in the selected state, display a switching control corresponding to the at least one second virtual prop.

For example, the switching control is configured to be triggered to display an interaction control corresponding to the at least one second virtual prop.

For implementations of Operation 201 to Operation 203, reference may be made to the implementations of Operation 101 to Operation 103.

In the embodiments of this application, in response to the appearance of the at least two virtual props having the interaction function in the part of the region, that the first virtual prop in the at least two virtual props is in a selected state is displayed, and the at least one interaction control corresponding to the first virtual prop is displayed, so that the first virtual prop and the corresponding interaction control that are automatically selected are directly displayed to a user, a process that the user manually selects a virtual prop that needs to be interacted with currently is omitted, and the human-computer interaction efficiency may be effectively improved. In addition, through the switching control, switching among displaying of interaction controls of a plurality of virtual props is implemented, so that interaction with the plurality of virtual props is implemented through a limited number of controls, thereby effectively improving the utilization of display resources.

The following describes an exemplary application of the embodiments of this application in an actual application scenario.

In some embodiments, an account logs in to a client (such as a game application of a network version) run by a terminal, and a server calculates scene displaying data of the virtual scene, where the scene displaying data includes prop displaying data of a first virtual prop in a selected state, and sends the scene displaying data to the terminal. In a human-computer interaction interface of the client, at least part of a region including a virtual object in the virtual scene is displayed, at least two virtual props having an interaction function are displayed in the at least part of the region, the first virtual prop in the selected state in the at least two virtual props is displayed, and at least one interaction control corresponding to the first virtual prop is displayed. The terminal receives a trigger operation by the account on the interaction control, the terminal sends operation data of the trigger operation to the server through a network, the server calculates response data of the interaction control corresponding to the interaction function based on the operation data, the server sends the response data to the terminal through the network, and an interaction process between the virtual object and the virtual prop is displayed in the human-computer interaction interface of the terminal based on the response data.

In a game scene, the player controls the virtual object to interact with an interactive virtual prop in the virtual scene, and after the virtual object selects the virtual prop, the virtual object may perform diverse interaction actions with the virtual prop. For example, when the virtual prop is a chair, the virtual object may sit on the chair, and when the virtual prop is a bathtub, the virtual object may fill or drain the bathtub. However, when a plurality of virtual props are within an interaction range of the virtual object at the same time, a selection operation by the user on the chair needs to be received first, and a sit down operation by the user on the chair is received next, namely, the user needs to perform two operations to implement interaction. According to the prop interaction method in a virtual scene provided in the embodiments of this application, a virtual prop that is currently interacted with may be clarified, and more interactive virtual props may be effectively and accurately switched, thereby effectively improving the human-computer interaction efficiency. For example, an interaction process on the virtual prop may be implemented by only receiving the sit down operation by the user on the chair.

In some embodiments, referring to FIG. 5A, a virtual prop 502A is displayed in a human-computer interaction interface 501A, a selected mark 503A is displayed on the virtual prop 502A, and an interaction control 504A is further displayed in the human-computer interaction interface. In response to a trigger operation on the interaction control 504A, a virtual object 505A sits on the virtual prop 502A. When there is only one virtual prop having an interaction function within an identification range of the virtual object, the virtual prop having the interaction function and an interaction control corresponding to the virtual prop are displayed.

In some embodiments, referring to FIG. 5B, a chair 502B and a supply box 503B are displayed in a human-computer interaction interface 501B, a selected mark 504B is displayed on the chair 502B, and an interaction control 505B of the chair 502B is further displayed in the human-computer interaction interface. In response to a trigger operation on the interaction control 505B, a virtual object 506B sits on the chair 502B. In response to a trigger operation on a switching control 507B, in the human-computer interaction interface, the interaction control 505B of the chair 502B is hidden, an interaction control 508B of the supply box 503B is displayed, and the selected mark 504B is displayed on the supply box 503B. When there are only two virtual props having the interaction function within the identification range of the virtual object, a virtual prop currently recommended and having the interaction function, an interaction control corresponding to the virtual prop, and a switching control for quickly switching to another virtual prop are displayed.

In some embodiments, referring to FIG. 5C, FIG. 5C is a schematic diagram of an interface of a prop interaction method in a virtual scene according to an embodiment of this application. A first chair 502C, a supply box 503C, and a second chair 504C are displayed in a human-computer interaction interface 501C. A selected mark 505C is displayed on the first chair 502C. An interaction control 506C of the first chair 502C is further displayed in the human-computer interaction interface. In response to a trigger operation on the interaction control 506C of the first chair 502C, a virtual object 507C sits on the first chair 502C. In response to a trigger operation on a switching control 511C, in the human-computer interaction interface, the interaction control 506C of the first chair 502C is hidden, and an identifier control 508C of the supply box 503C and an identifier control 509C of the second chair are displayed. In response to a trigger operation on the identifier control 508C for the supply box 503C, the selected mark 505C is displayed on the supply box 503C, and in the human-computer interaction interface, the identifier control 508C of the supply box 503C and the identifier control 509C of the second chair are hidden, and an interaction control 510C of the supply box 503C is displayed. When there are at least three virtual props having the interaction function within the identification range of the virtual object, switching among interaction controls of the virtual props is performed through a judgment mechanism, and a virtual prop currently recommended is displayed.

In some embodiments, when there are a plurality of virtual props having an interaction function and close to the virtual object in the virtual scene, the player does not need to move a crosshair to select a virtual prop having the interaction function, and a virtual prop currently recommended for interaction can be accurately displayed. For a plurality of virtual props having the interaction function within a current identification range, identification is performed based on a number of the virtual props, and for different numbers, different identification procedures are performed, thereby achieving accurate switching among the plurality of virtual props.

Figure 6:
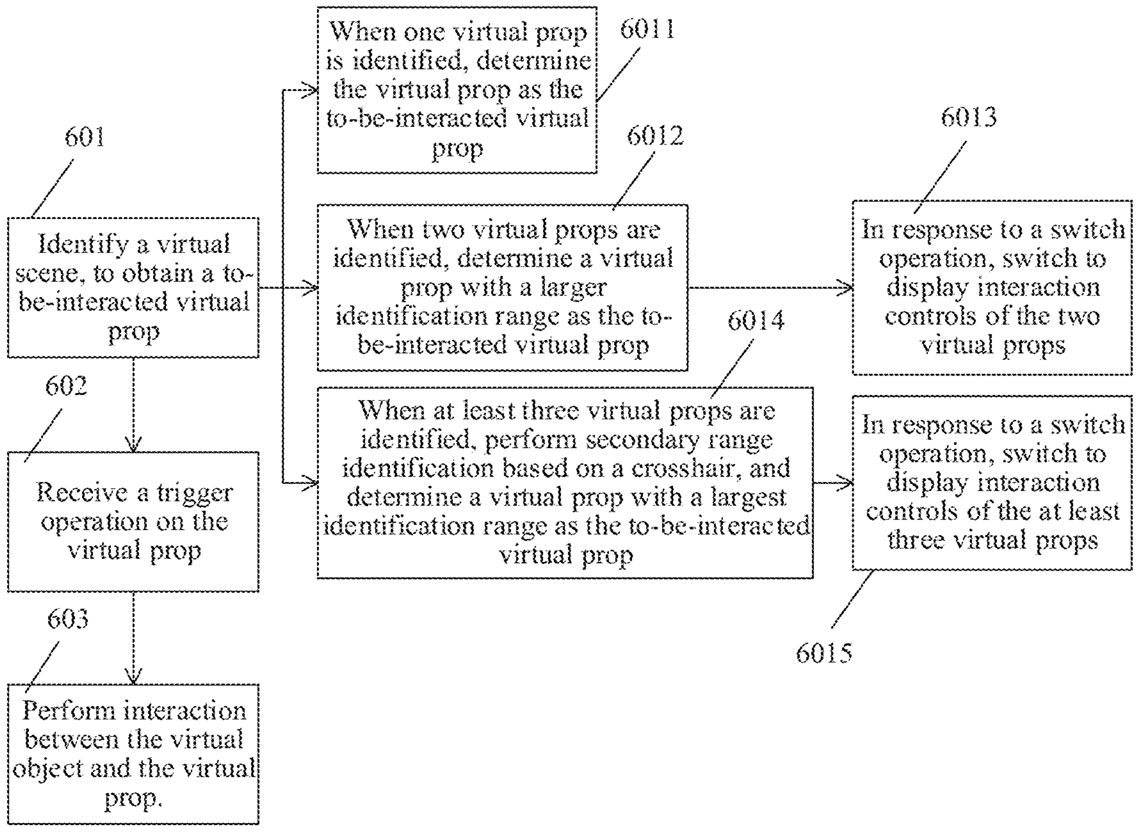
FIG. 6 is a schematic flowchart of a prop interaction method in a virtual scene according to an embodiment of this application.

In some embodiments, referring to FIG. 6, FIG. 6 is a schematic flowchart of a prop interaction method in a virtual scene according to an embodiment of this application. A player may control a virtual object to interact with a virtual prop that may be freely placed in the virtual scene. By identifying and switching the virtual prop, the player can accurately and conveniently complete interaction with a plurality of virtual props. Operation 601: Identify the virtual scene, to obtain a to-be-interacted virtual prop. Operation 602: Receive a trigger operation on the virtual prop. Operation 603: Perform interaction between the virtual object and the virtual prop. Operation 601 may be implemented through Operation 6011. Operation 6011: When one virtual prop is identified, determine the virtual prop as the to-be-interacted virtual prop. Operation 601 may alternatively be implemented through Operation 6012 and Operation 6013. Operation 6012: When two virtual props are identified, determine a virtual prop with a larger identification range as the to-be-interacted virtual prop. Operation 6013: In response to a switch operation, switch to display interaction controls of the two virtual props. Operation 601 may alternatively be implemented through Operation 6014 and Operation 6015. Operation 6014: When at least three virtual props are identified, perform secondary range identification based on a crosshair, and determine a virtual prop with a largest identification range as the to-be-interacted virtual prop. Operation 6015: In response to a switch operation, switch to display interaction controls of the at least three virtual props.

Figure 7A:
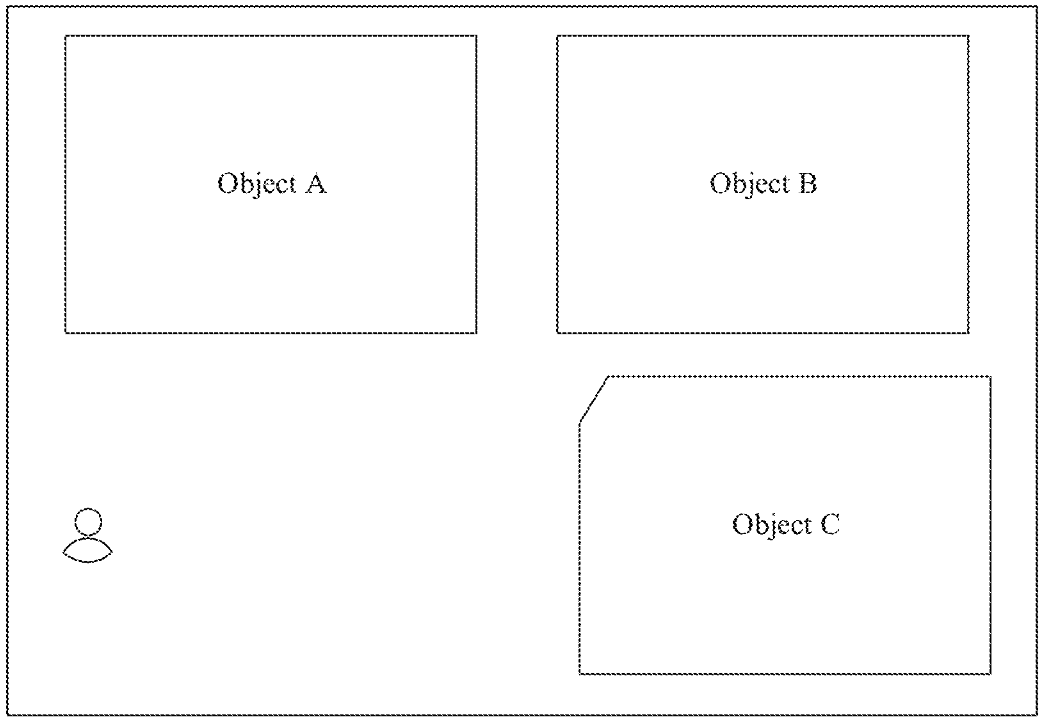
FIG. 7A and FIG. 7B are schematic diagrams of an overlapping region in a prop interaction method in a virtual scene according to an embodiment of this application.
Figure 7B:
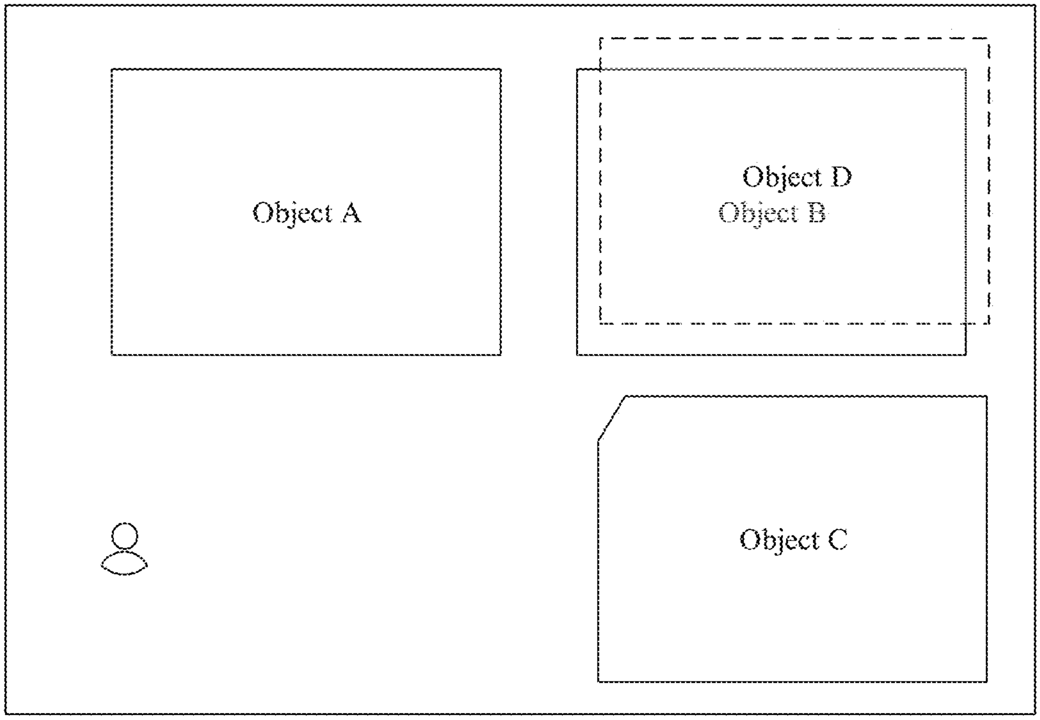

In some embodiments, the player controls the virtual object to interact with different objects (virtual props) in a game scene, and different types of operations such as viewing, dialogging, and picking may be performed. The player controls the virtual object to interact with an object in the virtual scene, when there are a plurality of objects in the virtual scene at the same time, reference may be made to FIG. 7A and FIG. 7B, where the virtual object interacts with an object A, an object B, and an object C, and objects may be in an overlapped state, for example, the object B and an object D may be in the overlapped state.

In some embodiments, referring to FIG. 8A, FIG. 8A shows a projection 801A of a virtual prop A1 on a ground in a virtual scene and a projection 802A of a virtual prop A2 on the ground in the virtual scene, where the ground is a plane formed by X and Y coordinate axes. A fan shape 804A (a crosshair view) with a virtual object 803A as a center of a circle and a set distance r as a radius is obtained, where a ray of the virtual object facing a crosshair direction is an angular bisector of the fan shape. Since projections of only two virtual props overlap with the fan shape, this represents that the two virtual props are both in the crosshair view, and interaction is performed with a virtual prop with a larger projection proportion in the crosshair view. Therefore, a virtual prop whose projection has a larger overlapping area with the fan shape may be directly determined as a virtual prop that is interacted with. For example, the virtual prop A1 corresponding to the projection 801A shown in FIG. 8A is determined as the virtual prop that is interacted with. Through a trigger operation on a switching control, switching among displaying of interaction controls of the two virtual props may be completed. The player does not need to control the virtual object to move the crosshair to change a projection proportion of the virtual prop in the crosshair view.

In some embodiments, referring to FIG. 8B, FIG. 8B shows a projection 801B of a virtual prop B1 on a ground in a virtual scene, a projection 802B of a virtual prop B2 on the ground in the virtual scene, and a projection 803B of a virtual prop B3 on the ground in the virtual scene. A first fan shape 805B (a first crosshair view) with a virtual object 804B as a center of a circle and a set distance r as a radius is obtained, where a ray of the virtual object facing a crosshair direction is an angular bisector of the first fan shape 805B. Since projections of three virtual props overlap with the first fan shape 805B, this represents that there are at least three virtual props in a crosshair view. A secondary crosshair view is obtained based on a crosshair position to determine a virtual prop that is interacted with. A second fan shape 806B (a second crosshair view) with the virtual object 804B as a center of a circle and the set distance r as a radius is obtained, where the ray of the virtual object facing the crosshair direction is an angular bisector of the second fan shape 806B, and the second fan shape is smaller than the first fan shape. The virtual prop B1, the virtual prop B2, and the virtual prop B3 are all in the first crosshair view, and the virtual prop B1 and the virtual prop B2 are both in the second crosshair view. A virtual prop whose projection has a larger overlapping area with the second fan shape may be directly determined as the virtual prop that is interacted with. That is, the virtual prop B2 corresponding to the projection 802B shown in FIG. 8B is determined as the virtual prop that is interacted with, and by operating a control, switching among displaying of interaction controls corresponding to the virtual prop B1, the virtual prop B2, and the virtual prop B3 may be implemented.

In some embodiments, referring to FIG. 8C, FIG. 8C is a schematic diagram of calculating an overlapping region in a prop interaction method in a virtual scene according to an embodiment of this application. FIG. 8C shows a projection 801C of a virtual prop C1 on a ground in a virtual scene, a projection 802C of a virtual prop C2 on the ground in the virtual scene, and a projection 803C of a virtual prop C3 on the ground in the virtual scene. A fan shape 805C with a virtual object 804C as a center of a circle and a set distance r as a radius is obtained, where a ray of the virtual object facing a crosshair direction is an angular bisector of the fan shape 805C. Since the projection of the virtual prop C1 and the projection of the virtual prop C2 do not overlap with the fan shape 805C, and only the projection of the virtual prop C3 overlaps with the fan shape 805C, so that the virtual prop C3 is determined as a virtual prop that is interacted with, and interaction with the virtual prop C1 and the virtual prop C2 is not triggered.

In some embodiments, referring to FIG. 8D, FIG. 8D is a schematic diagram of calculating an overlapping region in a prop interaction method in a virtual scene according to an embodiment of this application. FIG. 8D shows a projection 801D of a virtual prop D1 on a ground in a virtual scene, a projection 802D of a virtual prop D2 on the ground in the virtual scene, and a projection 803D of a virtual prop D3 on the ground in the virtual scene. A first fan shape 805D (a first crosshair view) with a virtual object 804D as a center of a circle and a set distance r as a radius is obtained, where a ray of the virtual object facing a crosshair direction is an angular bisector of the first fan shape 805D. Since projections of three virtual props overlap with the first fan shape 805D, this represents that there are at least three virtual props in a crosshair view. A secondary crosshair view is obtained based on a crosshair position to determine a virtual prop that is currently interacted with. A second fan shape 806D (a second crosshair view) with the virtual object 804D as a center of a circle and the set distance r as a radius is obtained, where the ray of the virtual object facing the crosshair direction is an angular bisector of the second fan shape 806D, and the second fan shape is smaller than the first fan shape. The virtual prop D1, the virtual prop D2, and the virtual prop D3 are all in the first crosshair view, and the virtual prop D1 and the virtual prop D2 are both in the second crosshair view. A virtual prop whose projection has a larger overlapping area with the second fan shape may be directly determined as the virtual prop that is interacted with. That is, the virtual prop D1 corresponding to the projection 801D shown in FIG. 8D is determined as the virtual prop that is interacted with, and by operating a control, switching among displaying of interaction controls corresponding to the virtual prop D1, the virtual prop D2, and the virtual prop D3 may be implemented.

In some embodiments, referring to FIG. 8E, FIG. 8E shows a projection 801E of a virtual prop E1 on a ground in a virtual scene, a projection 802E of a virtual prop E2 on the ground in the virtual scene, a projection 803E of a virtual prop E3 on the ground in the virtual scene, and a projection 807E of a virtual prop E4 on the ground in the virtual scene, where the virtual prop E2 and the virtual prop E4 are in an overlapped state on a Z-axis. A first fan shape 805E (a first crosshair view) with a virtual object 804E as a center of a circle and a set distance r as a radius is obtained, where a ray of the virtual object facing a crosshair direction is an angular bisector of the first fan shape 805E. Since projections of three virtual props overlap with the first fan shape 805E, this represents that there are at least three virtual props in a crosshair view. A secondary crosshair view is obtained based on a crosshair position to determine a virtual prop that is interacted with. A second fan shape 806E (a second crosshair view) with the virtual object 804E as a center of a circle and the set distance r as a radius is obtained, where the ray of the virtual object facing the crosshair direction is an angular bisector of the second fan shape 806E, and the second fan shape is smaller than the first fan shape. The virtual prop E1, the virtual prop E2, the virtual prop E3, and the virtual prop E4 are all in the first crosshair view, and the virtual prop E1, the virtual prop E2, and the virtual prop E4 are all in the second crosshair view. A virtual prop whose projection has a larger overlapping area with the second fan shape may be directly determined as the virtual prop that is interacted with. That is, the virtual prop E2 corresponding to the projection 802E shown in FIG. 8E is determined as the virtual prop that is interacted with, and by operating a control, switching among displaying of interaction controls corresponding to the virtual prop E1, the virtual prop E2, and the virtual prop E4 may be implemented.

In the related art, when a plurality of virtual props are densely placed in a virtual scene, it is difficult to clarify a virtual prop that is interacted with, and especially when a plurality of virtual props are stacked in a Z-axis direction, a screen may be moved frequently to control a crosshair to adjust a to-be-interacted virtual prop. With the help of the embodiments of this application, the player may clarify the virtual prop that is interacted with, and switching among interaction with a plurality of virtual props is implemented through a limited number of controls.

In the embodiments of this application, relevant data such as user information or the like is involved. When the embodiments of this application are applied to specific products or technologies, user permission or consent is required, and collection, use, and processing of relevant data need to comply with relevant laws, regulations, and standards of relevant countries and regions.

The following continues to describe an exemplary structure that the prop interaction apparatus 455-1 in a virtual scene provided in the embodiments of this application is implemented as a software module. In some embodiments, as shown in FIG. 3, the software module in the prop interaction apparatus 455-1 in a virtual scene stored in the memory 450 may include: a first display module 4551, configured to display at least part of a region in the virtual scene in a human-computer interaction interface, where the at least part of the region includes a virtual object; and the first display module 4551 being further configured to: in response to appearance of at least two virtual props having an interaction function in the at least part of the region, display that a first virtual prop in the at least two virtual props is in a selected state, and display at least one interaction control corresponding to the first virtual prop, where the interaction control is configured to be triggered to execute the interaction function corresponding to the interaction control, and the interaction function is configured for performing interaction between the virtual object and the first virtual prop.

In some embodiments, the first display module 4551 is further configured to: in response to the appearance of the at least two virtual props having the interaction function in the at least part of the region, apply a first display mode to the at least two virtual props in the at least part of the region, where a significance degree of the first display mode is positively correlated with a feature value of each of the at least two virtual props, and the feature value includes at least one of the following: a usage frequency of the virtual prop, a distance between the virtual prop and the virtual object, and an orientation angle between the virtual prop and the virtual object.

In some embodiments, the first display module 4551 is further configured to: in response to the appearance of the at least two virtual props having the interaction function in the at least part of the region, apply the first display mode to the at least two virtual props in the human-computer interaction interface, and apply a second display mode to another virtual prop in the human-computer interaction interface, where the second display mode is different from the first display mode, and the another virtual prop does not have the interaction function.

In some embodiments, the first display module 4551 is further configured to: before displaying that a first virtual prop in the at least two virtual props is in a selected state, determine a first fan-shaped region with the virtual object as a center of a circle, a set distance as a radius, and a first angle ad a central angle, where an orientation of the virtual object coincides with an angular bisector of the central angle of the first fan-shaped region; determine at least one first candidate virtual prop that overlaps with the first fan-shaped region, where a projection region of the first candidate virtual prop on a ground in the virtual scene overlaps with the first fan-shaped region; and determine one first candidate virtual prop in the at least one first candidate virtual prop as the first virtual prop.

In some embodiments, the first display module 4551 is further configured to: when the first fan-shaped region includes one first candidate virtual prop, determine the first candidate virtual prop as the first virtual prop; when the first fan-shaped region includes two first candidate virtual props, determine a first candidate virtual prop with a larger area in a first overlapping region as the first virtual prop, where the first overlapping region is an overlapping region between the first candidate virtual prop and the first fan-shaped region; and when the first fan-shaped region includes at least three first candidate virtual props, perform the following processing: determining a second fan-shaped region with the virtual object as a center of a circle, the set distance as a radius, and a second angle as a central angle, where the orientation of the virtual object coincides with an angular bisector of the central angle of the second fan-shaped region, and the second angle is smaller than the first angle; determining at least one second candidate virtual prop that overlaps with the second fan-shaped region, where a projection region of the second candidate virtual prop on the ground in the virtual scene overlaps with the second fan-shaped region; and determining a second candidate virtual prop with a largest area in a second overlapping region as the first virtual prop, where the second overlapping region is an overlapping region between the second candidate virtual prop and the second fan-shaped region.

In some embodiments, the first display module 4551 is further configured to: before displaying that a first virtual prop in the at least two virtual props is in a selected state, perform any of the following processing: performing sorting processing on the at least two virtual props according to a usage frequency, and determining a virtual prop ranked first as the first virtual prop; performing sorting processing on the at least two virtual props according to a scene distance, and determining a virtual prop ranked first as the first virtual prop, where the scene distance is a distance between the virtual prop and the virtual object in the virtual scene; or performing sorting processing on the at least two virtual props according to latest usage time, and determining a virtual prop ranked first as the first virtual prop, where the latest usage time is a moment at which the virtual object uses the virtual prop last time.

In some embodiments, the first display module 4551 is further configured to: before displaying that a first virtual prop in the at least two virtual props is in a selected state, obtain historical interaction data and a prop parameter of each of the at least two virtual props in the virtual scene, where the historical interaction data of each virtual prop include a scene parameter for each use of the virtual prop; perform the following processing through a first neural network model: extracting a scene feature from the scene parameter, and extracting a prop feature is extracted from the prop parameter; performing fusion processing on the scene feature and the prop feature to obtain a first fused feature; and mapping the first fused feature into a first probability of each virtual prop adapting to the virtual scene; and perform sorting processing on the at least two virtual props in descending order of the first probability, and determining a virtual prop ranked first as the first virtual prop.

In some embodiments, the first display module 4551 is further configured to: for at least one second virtual prop not in the selected state, display a switching control corresponding to the at least one second virtual prop, where the second virtual prop has the interaction function, and the switching control is configured to be triggered to display an interaction control corresponding to the at least one second virtual prop.

In some embodiments, the first display module 4551 is further configured to: when there is one second virtual prop not in the selected state, in response to a trigger operation on the switching control, display at least one interaction control of the second virtual prop, and hide the at least one interaction control of the first virtual prop.

In some embodiments, the first display module 4551 is further configured to: when there are a plurality of second virtual props not in the selected state, in response to a trigger operation on the switching control, display prop identifiers in one-to-one correspondence with the plurality of second virtual props; and in response to a trigger operation on any prop identifier, display at least one interaction control of a second virtual prop corresponding to the triggered prop identifier, and hide the at least one interaction control of the first virtual prop.

In some embodiments, the first display module 4551 is further configured to: display the prop identifiers in one-to-one correspondence with the plurality of second virtual props according to a set order, where a number of the plurality of second virtual props is any one of the following: a set number, a number positively correlated with a dimension of the human-computer interaction interface, a number positively correlated with an area of an idle region in the virtual scene, or a number positively correlated with a prop number of the second virtual props.

In some embodiments, the set order is any one of the following: a descending order or an ascending order of usage frequencies of the second virtual props; an ascending order or a descending order of scene distances of the second virtual props, where the scene distance is a distance between the virtual prop and the virtual object in the virtual scene; an order from near to far or an order from far to near of latest usage time of the second virtual props, where the latest usage time is a moment at which the virtual object uses the second virtual prop last time; or an ascending order or a descending order of interaction efficiency between the second virtual props and the virtual object.

In some embodiments, the first display module 4551 is further configured to: determine a second fan-shaped region with the virtual object as a center of a circle, the set distance as a radius, and a second angle as a central angle, where the orientation of the virtual object coincides with an angular bisector of the central angle of the second fan-shaped region, and the second angle is smaller than the first angle; and obtain a third overlapping region between each second virtual prop and the second fan-shaped region, where the third overlapping region is an overlapping region between a projection region of the second virtual prop on a ground in the virtual scene and the second fan-shaped region, and obtain interaction efficiency positively correlated with an area of the third overlapping region.

The following continues to describe an exemplary structure that the prop interaction apparatus 455-2 in a virtual scene provided in the embodiments of this application is implemented as a software module. In some embodiments, as shown in FIG. 3, the software module in the prop interaction apparatus 455-2 in a virtual scene stored in the memory 450 may include: a second display module 4552, configured to display at least part of a region in the virtual scene in a human-computer interaction interface, where the at least part of the region includes a virtual object; the second display module 4552 being further configured to: in response to appearance of at least two virtual props in the at least part of the region, display, based on a selected state, a first virtual prop having an interaction function in the at least two virtual props and at least one interaction control corresponding to the first virtual prop, where the interaction control is configured to be triggered to execute the interaction function corresponding to the interaction control, and the interaction function is configured for performing interaction with the virtual object; and the second display module 4552 being further configured to: for at least one second virtual prop not in the selected state, display a switching control corresponding to the at least one second virtual prop, where the switching control is configured to be triggered to display an interaction control corresponding to the at least one second virtual prop.

An embodiment of this application provides a computer program product, where the computer program product includes a computer-executable instruction, and the computer-executable instruction is stored in a computer-readable storage medium. A processor of an electronic device reads the computer-executable instruction from the computer-readable storage medium, and the processor executes the computer-executable instruction, to cause the electronic device to perform the prop interaction method in a virtual scene according to the embodiments of this application.

An embodiment of this application provides a non-transitory computer-readable storage medium that has a computer-executable instruction stored therein. When the computer-executable instruction is executed by a processor, the processor is caused to perform the prop interaction method in a virtual scene according to the embodiments of this application, for example, the prop interaction methods in a virtual scene shown in FIG. 4A to FIG. 4C.

In some embodiments, the computer-readable storage medium may be a memory such as an FRAM, a ROM, a PROM, an EPROM, an EEPROM, a flash memory, a magnetic surface memory, an optical disk, or a CD-ROM; or may be various devices including one or any combination of the foregoing memories.

In some embodiments, the computer-executable instruction may be written in any form of programming language (including a compiled or interpreted language, or a declarative or procedural language) by using a form of a program, software, a software module, a script, or code, and may be deployed in any form, including being deployed as an independent program or being deployed as a module, a component, a subroutine, or another unit suitable for use in a computing environment.

For example, the computer-executable instruction may, but do not necessarily, correspond to a file in a file system, and may be stored in a part of a file that saves another program or data, for example, be stored in one or more scripts in a hypertext markup language (HTML) file, stored in a single file dedicated to a program in discussion, or stored in a plurality of collaborative files (for example, be stored in files of one or more modules, subprograms, or code parts).

For example, the computer-executable instruction may be deployed to be executed on an electronic device, or executed on a plurality of electronic devices located at the same location, or executed on a plurality of electronic devices that are distributed in a plurality of locations and interconnected through a communication network.

In summary, in the embodiments of this application, in response to the appearance of the at least two virtual props having the interaction function in the at least part of the region, that the first virtual prop in the at least two virtual props is in the selected state is displayed, and the at least one interaction control corresponding to the first virtual prop is displayed, so that the first virtual prop and the corresponding interaction control that are automatically selected are directly displayed to a player, a process that the player manually selects a virtual prop that needs to be interacted with currently is omitted, and the human-computer interaction efficiency may be effectively improved.

The foregoing merely describes the embodiments of this application and is not intended to limit a protection scope of this application. Any modification, equivalent replacement, or improvement made without departing from the spirit and scope of this application shall fall within the protection scope of this application. In this application, the term “module” refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

What is claimed is:

1. A prop interaction method in a virtual scene, performed by an electronic device, the method comprising:

displaying at least part of a region in the virtual scene in a human-computer interaction interface, the at least part of the region comprising a virtual object;

in response to appearance of at least two virtual props in the at least part of the region, each having a corresponding interaction function in the at least part of the region, choosing a first virtual prop of the least two virtual props to be in a selected state based on at least a spatial relationship between each of the least two virtual props and the virtual object;

displaying at least one interaction control corresponding to the first virtual prop, wherein the interaction control, when triggered, is configured to execute the interaction function corresponding to the interaction control for performing interaction between the virtual object and the first virtual prop; and determining one first candidate virtual prop in at least one first candidate virtual prop as the first virtual prop, comprising:

when a first fan-shaped region comprises at least three first candidate virtual props, performing the following processing:

determining a second fan-shaped region with the virtual object as a center of a circle, a set distance as a radius, and a second angle as a central angle, wherein an orientation of the virtual object coincides with an angular bisector of the central angle of the second fan-shaped region, and the second angle is smaller than the first angle.

2. The method according to claim 1, wherein the method further comprises:

in response to the appearance of the at least two virtual props in the at least part of the region, applying a first display mode to the at least two virtual props in the at least part of the region, wherein a significance degree of the first display mode is positively correlated with a feature value of each of the at least two virtual props, and the feature value comprises at least one of the following: a usage frequency of the virtual prop, a distance between the virtual prop and the virtual object, and an orientation angle between the virtual prop and the virtual object.

3. The method according to claim 1, wherein the choosing a first virtual prop in the least two virtual props to be in a selected state further comprises:

determining the first fan-shaped region with the virtual object as the center of the circle, the set distance as a radius, and a first angle as a central angle, wherein an orientation of the virtual object coincides with an angular bisector of the central angle of the first fan-shaped region; and determining the at least one first candidate virtual prop that overlaps with the first fan-shaped region, wherein a projection region of the first candidate virtual prop on a ground in the virtual scene overlaps with the first fan-shaped region.

4. The method according to claim 3, wherein the determining one first candidate virtual prop in the at least one first candidate virtual prop as the first virtual prop comprises:

when the first fan-shaped region comprises one first candidate virtual prop, determining the first candidate virtual prop as the first virtual prop;

when the first fan-shaped region comprises two first candidate virtual props, determining a first candidate virtual prop with a larger area in a first overlapping region as the first virtual prop, wherein the first overlapping region is an overlapping region between the first candidate virtual prop and the first fan-shaped region; and when the first fan-shaped region comprises at least three first candidate virtual props, performing the following processing:

determining at least one second candidate virtual prop that overlaps with the second fan-shaped region, wherein a projection region of the second candidate virtual prop on the ground in the virtual scene overlaps with the second fan-shaped region; and determining a second candidate virtual prop with a largest area in a second overlapping region as the first virtual prop, wherein the second overlapping region is an overlapping region between the second candidate virtual prop and the second fan-shaped region.

5. The method according to claim 1, wherein the choosing a first virtual prop in the least two virtual props to be in a selected state further comprises:

performing any of the following processing:

performing sorting processing on the at least two virtual props according to a usage frequency, and determining a virtual prop ranked first as the first virtual prop;

performing sorting processing on the at least two virtual props according to a scene distance, and determining a virtual prop ranked first as the first virtual prop, wherein the scene distance is a distance between the virtual prop and the virtual object in the virtual scene; and performing sorting processing on the at least two virtual props according to latest usage time, and determining a virtual prop ranked first as the first virtual prop, wherein the latest usage time is a moment at which the virtual object uses the virtual prop last time.

6. The method according to claim 1, wherein the choosing a first virtual prop in the least two virtual props to be in a selected state further comprises:

obtaining historical interaction data and a prop parameter of each of the at least two virtual props in the virtual scene, wherein the historical interaction data of each virtual prop comprises a scene parameter for each use of the virtual prop;

performing the following processing through a first neural network model: extracting a scene feature from the scene parameter, and extracting a prop feature from the prop parameter; performing fusion processing on the scene feature and the prop feature, to obtain a first fused feature; and mapping the first fusion feature into a first probability of each virtual prop adapting to the virtual scene; and performing sorting processing on the at least two virtual props in descending order of the first probability, and determining a virtual prop ranked first as the first virtual prop.

7. The method according to claim 1, wherein the method further comprises:

for at least one second virtual prop not in the selected state, displaying a switching control corresponding to the at least one second virtual prop, wherein the second virtual prop has the interaction function, and the switching control is configured to be triggered to display an interaction control corresponding to the at least one second virtual prop.

8. The method according to claim 7, wherein the method further comprises:

when there is one second virtual prop not in the selected state, in response to a trigger operation on the switching control, displaying at least one interaction control of the second virtual prop, and hiding the at least one interaction control of the first virtual prop.

9. An electronic device, comprising:

a memory, configured to store a computer-executable instruction; and a processor, configured to implement, when executing the computer-executable instruction stored in the memory, a prop interaction method in a virtual scene, the method including:

displaying at least part of a region in the virtual scene in a human-computer interaction interface, the at least part of the region comprising a virtual object;

in response to appearance of at least two virtual props in the at least part of the region, each having a corresponding interaction function in the at least part of the region, choosing a first virtual prop of the least two virtual props to be in a selected state based on at least a spatial relationship between each of the least two virtual props and the virtual object;

displaying at least one interaction control corresponding to the first virtual prop, wherein the interaction control, when triggered, is configured to execute the interaction function corresponding to the interaction control for performing interaction between the virtual object and the first virtual prop; and determining one first candidate virtual prop in the at least one first candidate virtual prop as the first virtual prop, comprising:

when a first fan-shaped region comprises at least three first candidate virtual props, performing the following processing:

determining a second fan-shaped region with the virtual object as a center of a circle, a set distance as a radius, and a second angle as a central angle, wherein an orientation of the virtual object coincides with an angular bisector of the central angle of the second fan-shaped region, and the second angle is smaller than the first angle.

10. The electronic device according to claim 9, wherein the method further comprises:

in response to the appearance of the at least two virtual props in the at least part of the region, applying a first display mode to the at least two virtual props in the at least part of the region, wherein a significance degree of the first display mode is positively correlated with a feature value of each of the at least two virtual props, and the feature value comprises at least one of the following: a usage frequency of the virtual prop, a distance between the virtual prop and the virtual object, and an orientation angle between the virtual prop and the virtual object.

11. The electronic device according to claim 9, wherein the choosing a first virtual prop in the least two virtual props to be in a selected state further comprises:

determining a first fan-shaped region with the virtual object as a center of a circle, a set distance as a radius, and a first angle as a central angle, wherein an orientation of the virtual object coincides with an angular bisector of the central angle of the first fan-shaped region;

determining at least one first candidate virtual prop that overlaps with the first fan-shaped region, wherein a projection region of the first candidate virtual prop on a ground in the virtual scene overlaps with the first fan-shaped region; and determining one first candidate virtual prop in the at least one first candidate virtual prop as the first virtual prop.

12. The electronic device according to claim 9, wherein the choosing a first virtual prop in the least two virtual props to be in a selected state further comprises:

performing any of the following processing:

performing sorting processing on the at least two virtual props according to a usage frequency, and determining a virtual prop ranked first as the first virtual prop;

performing sorting processing on the at least two virtual props according to a scene distance, and determining a virtual prop ranked first as the first virtual prop, wherein the scene distance is a distance between the virtual prop and the virtual object in the virtual scene; and performing sorting processing on the at least two virtual props according to latest usage time, and determining a virtual prop ranked first as the first virtual prop, wherein the latest usage time is a moment at which the virtual object uses the virtual prop last time.

13. The electronic device according to claim 9, wherein the choosing a first virtual prop in the least two virtual props to be in a selected state further comprises:

obtaining historical interaction data and a prop parameter of each of the at least two virtual props in the virtual scene, wherein the historical interaction data of each virtual prop comprises a scene parameter for each use of the virtual prop;

performing the following processing through a first neural network model: extracting a scene feature from the scene parameter, and extracting a prop feature from the prop parameter; performing fusion processing on the scene feature and the prop feature, to obtain a first fused feature; and mapping the first fusion feature into a first probability of each virtual prop adapting to the virtual scene; and performing sorting processing on the at least two virtual props in descending order of the first probability, and determining a virtual prop ranked first as the first virtual prop.

14. The electronic device according to claim 9, wherein the method further comprises:

for at least one second virtual prop not in the selected state, displaying a switching control corresponding to the at least one second virtual prop, wherein the second virtual prop has the interaction function, and the switching control is configured to be triggered to display an interaction control corresponding to the at least one second virtual prop.

15. A non-transitory computer-readable storage medium, having a computer-executable instruction stored therein, wherein the computer-executable instruction, when executed by a processor of an electronic device, causes the electronic device to perform a prop interaction method in a virtual scene, the method including:

displaying at least part of a region in the virtual scene in a human-computer interaction interface, the at least part of the region comprising a virtual object;

in response to appearance of at least two virtual props in the at least part of the region, each having a corresponding interaction function in the at least part of the region, choosing a first virtual prop of the least two virtual props to be in a selected state based on at least a spatial relationship between each of the least two virtual props and the virtual object;

displaying at least one interaction control corresponding to the first virtual prop, wherein the interaction control, when triggered, is configured to execute the interaction function corresponding to the interaction control for performing interaction between the virtual object and the first virtual prop; and determining one first candidate virtual prop in the at least one first candidate virtual prop as the first virtual prop, comprising:

when a first fan-shaped region comprises at least three first candidate virtual props, performing the following processing:

determining a second fan-shaped region with the virtual object as a center of a circle, a set distance as a radius, and a second angle as a central angle, wherein an orientation of the virtual object coincides with an angular bisector of the central angle of the second fan-shaped region, and the second angle is smaller than the first angle.

16. The non-transitory computer-readable storage medium according to claim 15, wherein the method further comprises:

in response to the appearance of the at least two virtual props in the at least part of the region, applying a first display mode to the at least two virtual props in the at least part of the region, wherein a significance degree of the first display mode is positively correlated with a feature value of each of the at least two virtual props, and the feature value comprises at least one of the following: a usage frequency of the virtual prop, a distance between the virtual prop and the virtual object, and an orientation angle between the virtual prop and the virtual object.

17. The non-transitory computer-readable storage medium according to claim 15, wherein the choosing a first virtual prop in the least two virtual props to be in a selected state further comprises:

determining a first fan-shaped region with the virtual object as a center of a circle, a set distance as a radius, and a first angle as a central angle, wherein an orientation of the virtual object coincides with an angular bisector of the central angle of the first fan-shaped region;

determining at least one first candidate virtual prop that overlaps with the first fan-shaped region, wherein a projection region of the first candidate virtual prop on a ground in the virtual scene overlaps with the first fan-shaped region; and determining one first candidate virtual prop in the at least one first candidate virtual prop as the first virtual prop.

18. The non-transitory computer-readable storage medium according to claim 15, wherein the choosing a first virtual prop in the least two virtual props to be in a selected state further comprises:

performing any of the following processing:

performing sorting processing on the at least two virtual props according to a usage frequency, and determining a virtual prop ranked first as the first virtual prop;

performing sorting processing on the at least two virtual props according to a scene distance, and determining a virtual prop ranked first as the first virtual prop, wherein the scene distance is a distance between the virtual prop and the virtual object in the virtual scene; and performing sorting processing on the at least two virtual props according to latest usage time, and determining a virtual prop ranked first as the first virtual prop, wherein the latest usage time is a moment at which the virtual object uses the virtual prop last time.

19. The non-transitory computer-readable storage medium according to claim 15, wherein the choosing a first virtual prop in the least two virtual props to be in a selected state further comprises:

obtaining historical interaction data and a prop parameter of each of the at least two virtual props in the virtual scene, wherein the historical interaction data of each virtual prop comprises a scene parameter for each use of the virtual prop;

performing the following processing through a first neural network model: extracting a scene feature from the scene parameter, and extracting a prop feature from the prop parameter; performing fusion processing on the scene feature and the prop feature, to obtain a first fused feature; and mapping the first fusion feature into a first probability of each virtual prop adapting to the virtual scene; and performing sorting processing on the at least two virtual props in descending order of the first probability, and determining a virtual prop ranked first as the first virtual prop.

20. The non-transitory computer-readable storage medium according to claim 15, wherein the method further comprises:

for at least one second virtual prop not in the selected state, displaying a switching control corresponding to the at least one second virtual prop, wherein the second virtual prop has the interaction function, and the switching control is configured to be triggered to display an interaction control corresponding to the at least one second virtual prop.

* * * * *